(12) United States Patent
Wade et al.

(10) Patent No.: US 7,646,697 B2
(45) Date of Patent: Jan. 12, 2010

(54) OPTICAL HEAD DEVICE AND DISK DRIVE DEVICE

(75) Inventors: Tatsuki Wade, Nagano (JP); Takafumi Kasuga, Nagano (JP); Takahiro Shiraki, Nagano (JP)

(73) Assignee: Nidec Sankyo Corporation (JP)

( * ) Notice: Subject to any disclaimer, the term of this patent is extended or adjusted under 35 U.S.C. 154(b) by 554 days.

(21) Appl. No.: 11/646,010

(22) Filed: Dec. 27, 2006

(65) Prior Publication Data

US 2007/0171806 A1    Jul. 26, 2007

(30) Foreign Application Priority Data

Dec. 27, 2005  (JP)  ............................. 2005-373736
Dec. 27, 2005  (JP)  ............................. 2005-373827

(51) Int. Cl.
*G11B 5/10* (2006.01)
(52) U.S. Cl. ....................... 369/121; 369/120
(58) Field of Classification Search ........................ None
See application file for complete search history.

(56) References Cited

U.S. PATENT DOCUMENTS 7,428,192 B2 * 9/2008 Ochi et al. ............... 369/44.14
2005/0237905 A1 * 10/2005 Nabe et al. ................. 369/120

FOREIGN PATENT DOCUMENTS

JP    2004-192720    7/2004
JP    2004-192751    7/2004

* cited by examiner

*Primary Examiner*—Joseph H Feild
*Assistant Examiner*—Tawfik Goma
(74) *Attorney, Agent, or Firm*—Cantor Colburn LLP

(57) ABSTRACT

An optical head device may include a frame type of laser beam emitting element provided with a heat radiating fin on which a laser chip is mounted, a device frame on which the laser beam emitting element, a light receiving element and an optical system are mounted, and a heat radiation member formed of material having a superior heat conduction property. The upper face of the laser beam emitting element is fixed to the device frame, and an under face of the heat radiating fin which corresponds to a portion where the laser chip is mounted is exposed on an outer side to form an exposed part, and the heat radiation member is disposed to extend over the exposed part and the device frame. The device frame may include a first protective cover covering the optical disk side of the optical elements, and a second protective cover which covers the optical disk side of the objective lens drive mechanism and which is separately formed from the first protective cover and made of material having a superior heat conduction property, and a part of the second protective cover is extended to a laser driver IC, which is disposed to be exposed on the optical disk side, to form a heat radiation part where heat generated in the laser driver IC is radiated.

16 Claims, 14 Drawing Sheets

[Fig. 1]
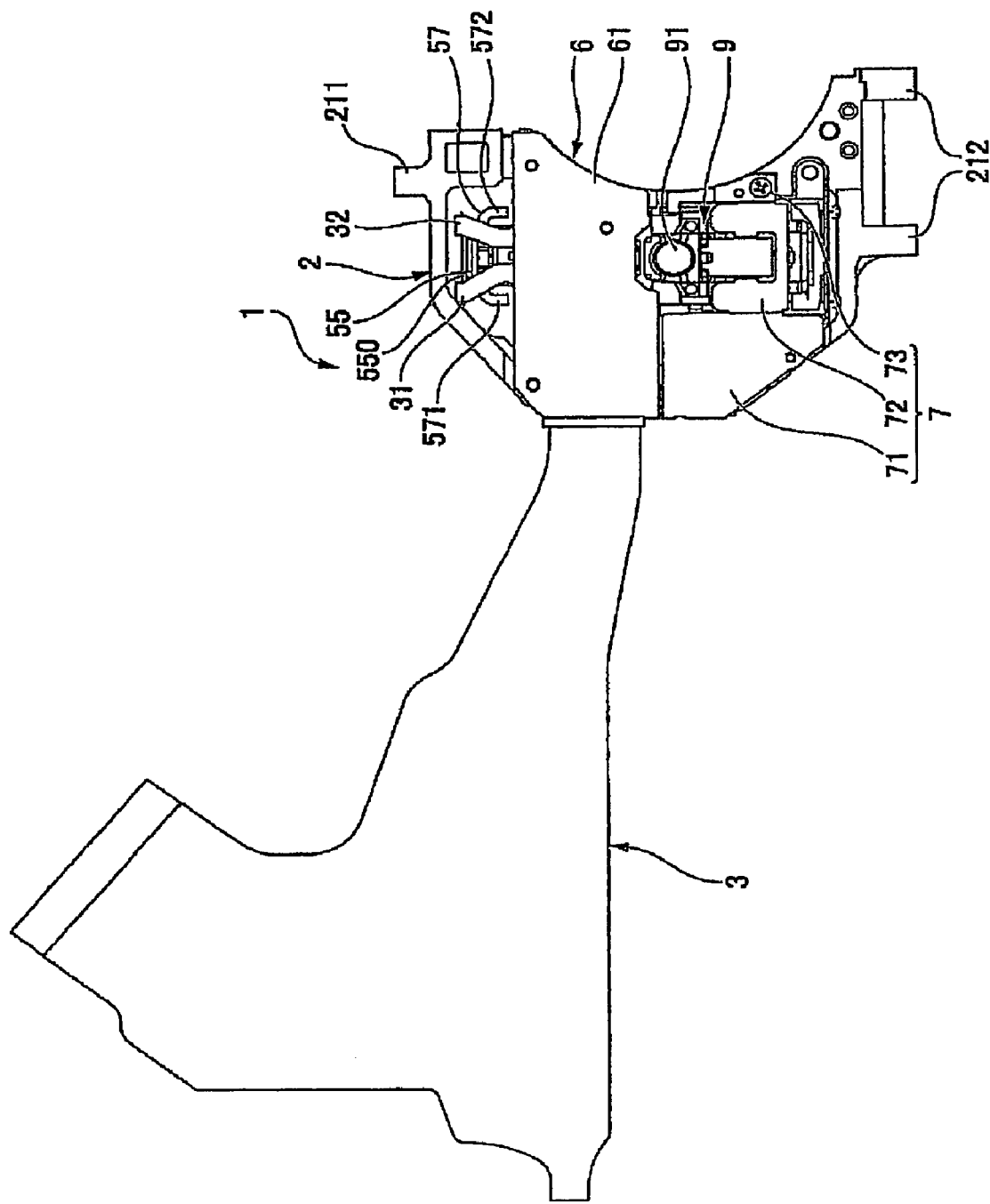

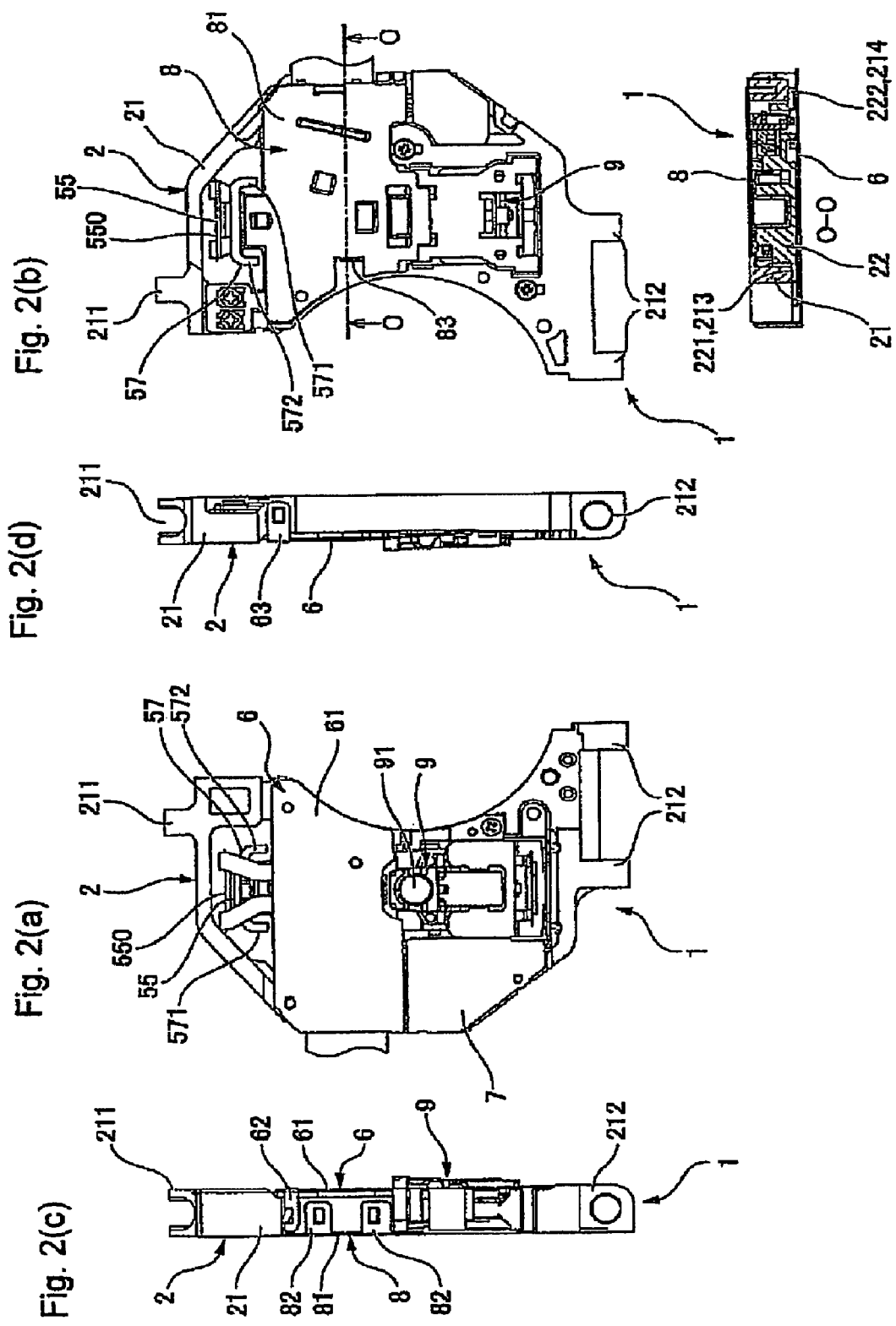

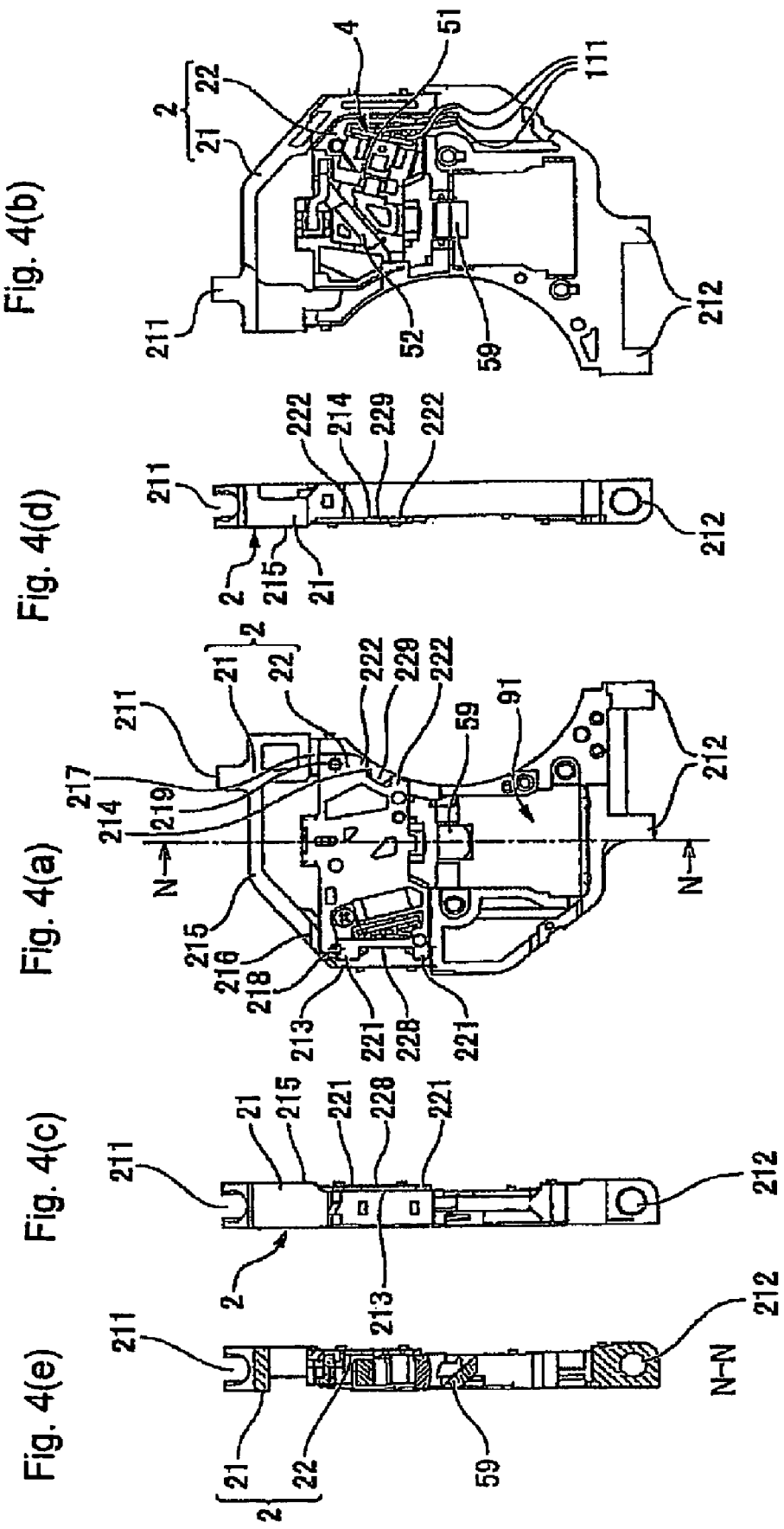

[Fig. 7]
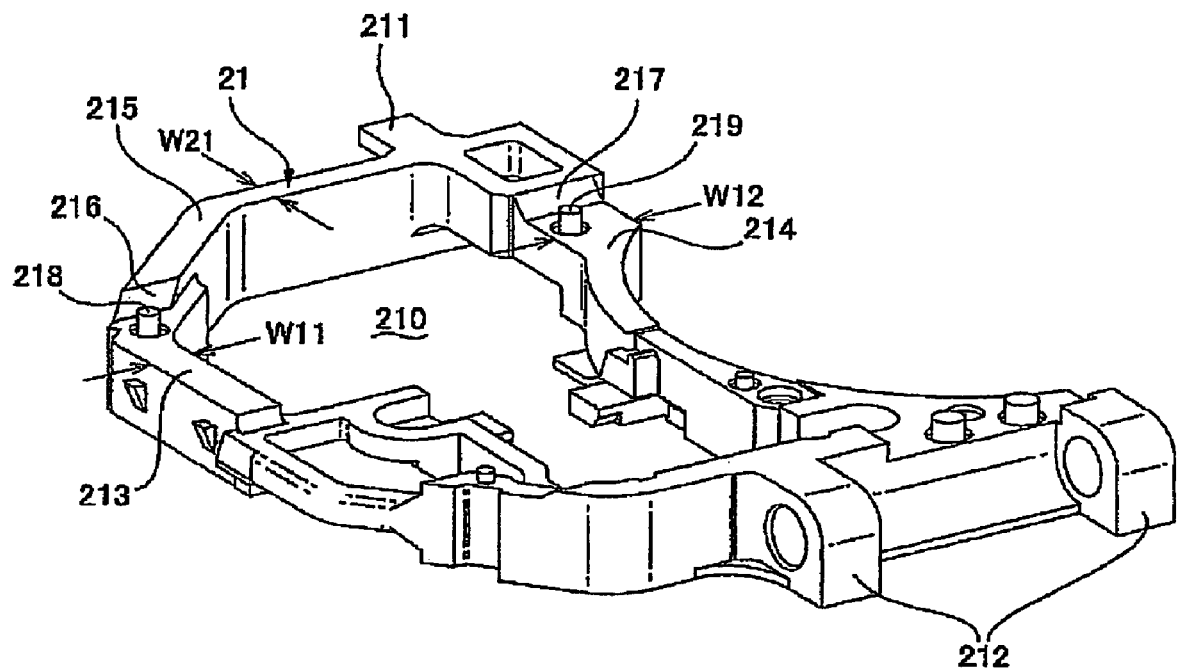

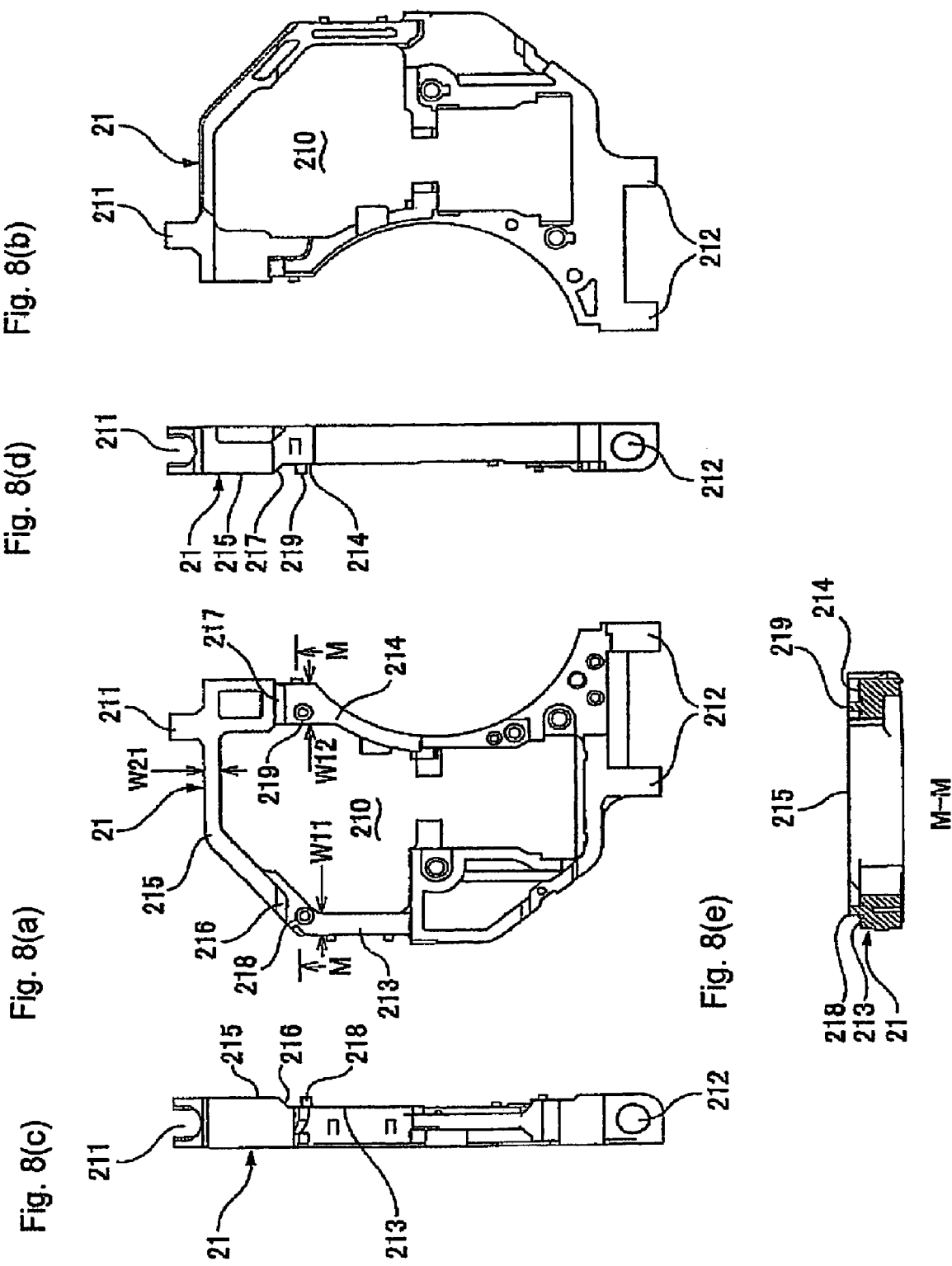

[Fig. 11]
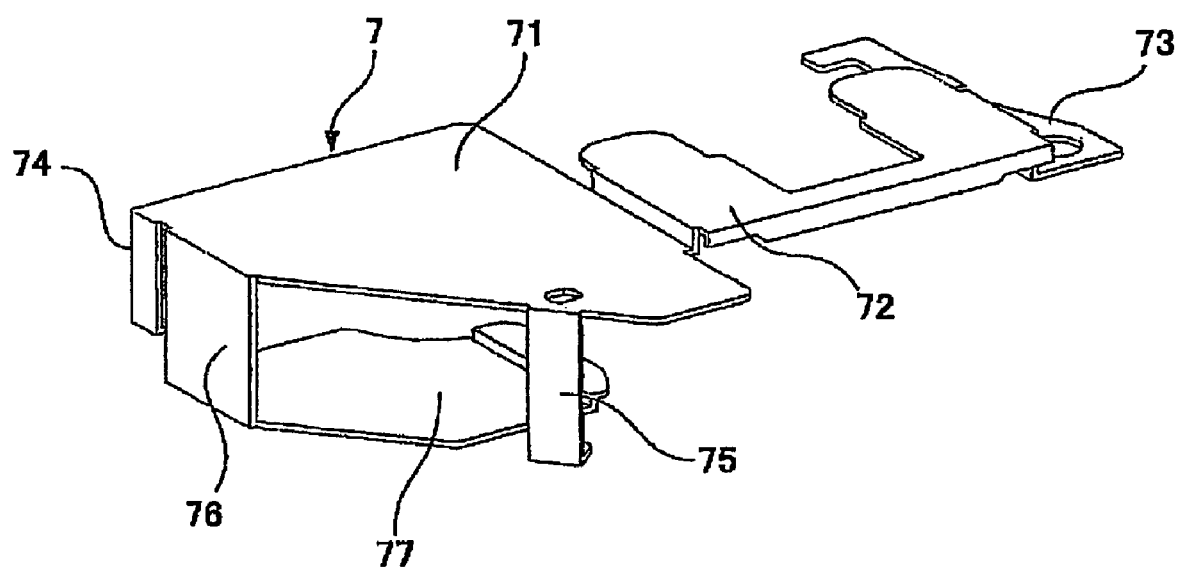

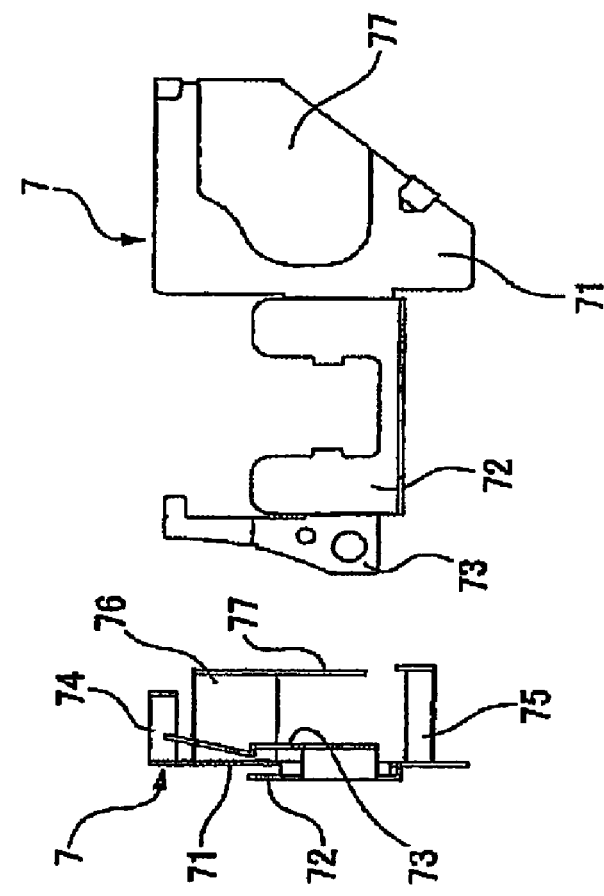
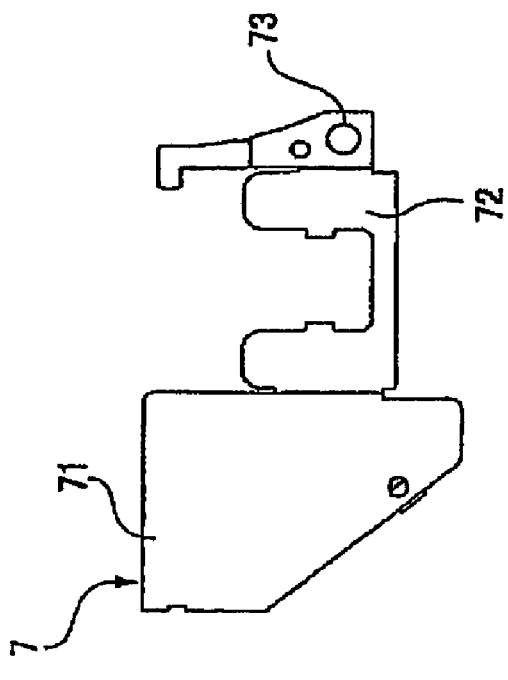

[Fig. 13]
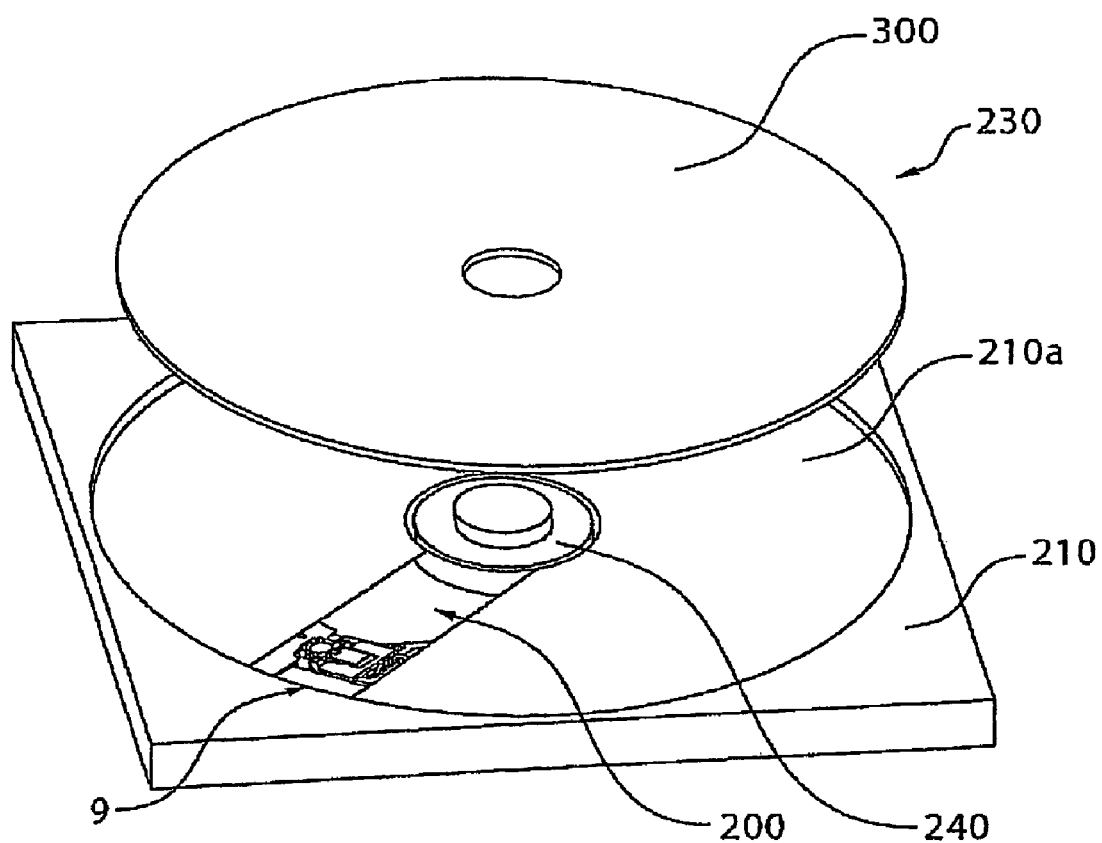

[Fig. 14]
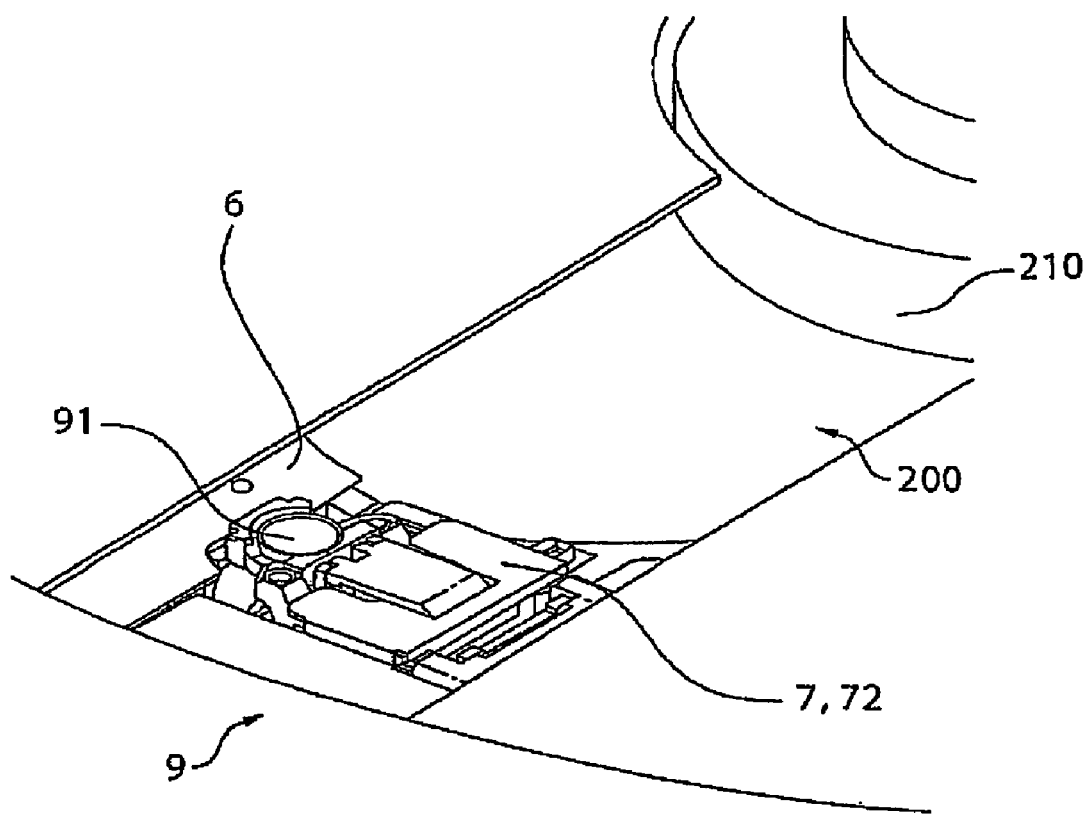

[Fig. 15]
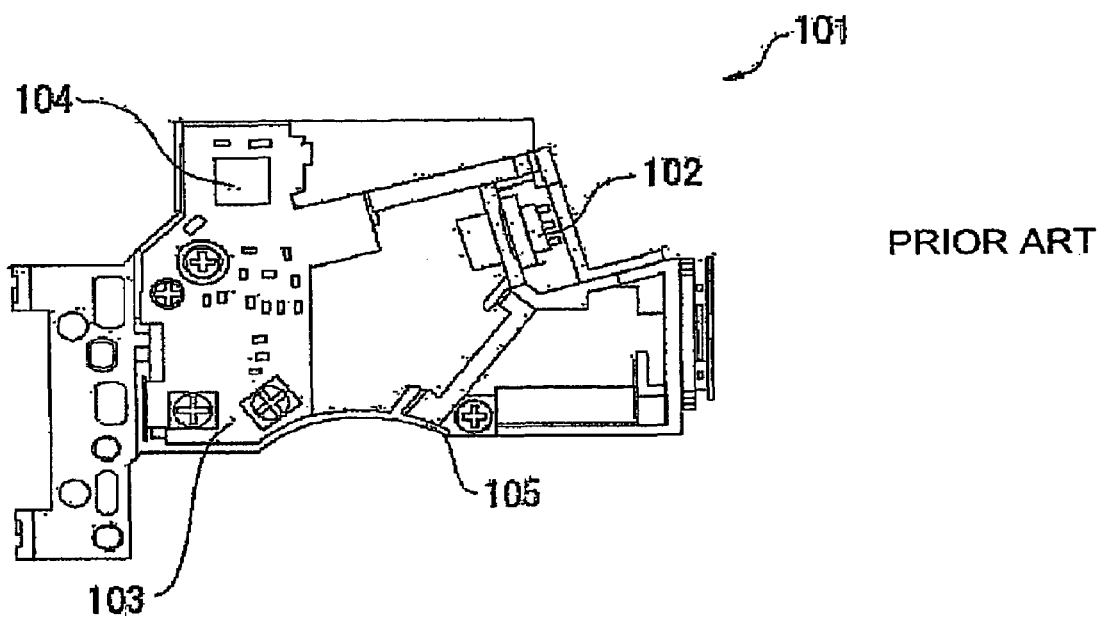
PRIOR ART
[Fig. 16]
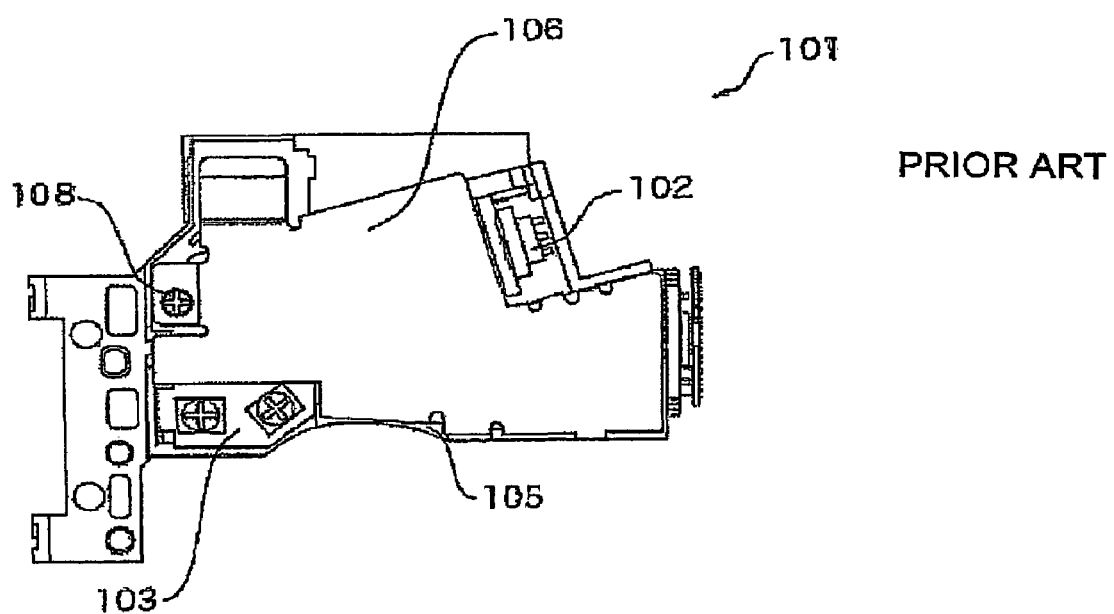
PRIOR ART

OPTICAL HEAD DEVICE AND DISK DRIVE DEVICE

The present invention claims priority under 35 U.S.C. §119 to Japanese Application No. 2005-373736 filed Dec. 27, 2005 and Japanese Application No. 2005-373827 filed Dec. 27, 2005, both of which are incorporated herein by reference.

FIELD OF THE INVENTION

An embodiment of the present invention may relate to an optical head device which is used for recording or reproducing information into or from an optical disk such as a CD or a DVD. More specifically, an embodiment of the present invention may relate to a heat radiation structure for a frame type of laser beam emitting element provided in the optical head device and may relate to a heat radiation structure for a laser driver which drives a laser beam emitting element provided in the optical head device.

BACKGROUND OF THE INVENTION

A conventional optical head device which is used for reproducing information from an optical disk such as a CD or a DVD includes a laser beam emitting element, an objective lens drive mechanism which is provided with an objective lens for converging a laser beam emitted from the laser beam emitting element on an optical disk and is driven in a focusing direction and in a tracking direction, a light receiving element which receives a return light reflected by the optical disk, and parts for an optical system for guiding the laser beam between the laser beam emitting element and the light receiving element. These optical parts are mounted on a base.

As shown in Japanese Patent Laid-Open No. 2004-192720, a conventional frame type of laser beam emitting element 2 is held with a light emitting element holder 9 which is formed of a first holder member 91 and a second holder member 92 abutting with fins 24a, 25a from both sides to hold the laser beam emitting element 2 and is adhesively fixed to the base 10.

When the light emitting element holder 9 is to be adhesively fixed to the base 10, the position of an emitted light point of the laser beam emitting element 2 is required to be adjusted in a three-dimensional direction. Therefore, the light emitting element holder 9 and the base 10 are adhesively fixed to each other through a gap space in which the position of the emitted light point of the laser beam emitting element 2 can be adjusted in a three-dimensional direction.

With the speeding-up of disk dive device operation in recent years, the amount of heat generated in the laser beam emitting element 2 is also increased. In addition, with the miniaturization and thinning of an optical head device, since the light emitting element holder 9 of the laser beam emitting element 2 is downsized, heat radiation can not be sufficiently performed by only the heat radiating fins 24a, 25a. In order to solve the problem, for example, it is conceivable that the light emitting element holder 9 is formed of material, which is excellent in heat conductive property, to radiate heat from the heat radiating fins 24a, 25a to the light emitting element holder 9. However, with the miniaturization and thinning of an optical head device, since the light emitting element holder 9 is downsized, heat radiation can not be performed sufficiently even when such the light emitting element holder 9 is used. In the light emitting element holder 9 described in the above-mentioned patent reference, a gap space is provided between the light emitting element holder 9 and the base 10 so as to be capable of adjusting the position of the emitted light point of the laser beam emitting element 2 in a three-dimensional direction. Therefore, since heat radiation can not be sufficiently performed to the base 10 from the light emitting element holder 9, temperature of the laser beam emitting element 2 becomes higher and thus a service life time of the laser beam emitting element 2 maybe shortened.

Further, another conventional optical head device which is used for reproducing information from an optical disk such as a CD or a DVD includes an optical system having a laser beam emitting element as a light source, a laser driver integrated circuit (laser driver IC) for driving the laser beam emitting element, a frame on which the optical system is mounted, a cover fixed to a frame for protecting the optical system and the like.

In this optical head device, the cover for protecting the optical system is commonly formed of a metal plate made of stainless steel and heat generated in the laser driver is radiated through the cover. In other words, in a conventional optical head device, a cover which functions as a heat sink for a laser driver is used. A conventional structure of the optical head device will be described with reference to FIGS. 15 and 16.

As shown in FIG. 15, an optical head device 101 includes a laser beam emitting element 102 as a light source, a laser driver IC 104 mounted on a circuit 103 for driving the laser beam emitting element 102, and a frame 105 on which an optical system including the laser beam emitting element 102 is mounted. Further, as shown in FIG. 16, a cover 106 formed of a stainless-steel plate is fixed to the frame 105 with a mounting screw 108 to protect the optical system.

As shown in FIG. 16, the cover 106 is fixed so as to cover almost the whole portion of a bottom face side of the frame 105, and optical elements structuring the optical system is covered by the cover 106. The cover 106 contacts with the laser driver IC 104 through a heat transmission sheet (not shown) which is provided with heat transmission property and elasticity. Therefore, heat generated in the laser driver IC 104 is radiated to the frame 105 through the heat transmission sheet and thus the cover 106 functions as a heat sink for the laser driver IC 104.

A method for positively radiating heat generated in the laser driver IC is disclosed in Japanese Patent Laid-Open No. 2004-192751, in which a laser driver IC is disposed on an optical disk side and air is circulated by rotation of the optical disk to radiate the heat generated in the laser driver IC to the air through a heat radiation member.

When the conventional optical head device 101 is structured as shown in FIG. 16, since the cover 106 functions as a heat sink for the laser driver IC 104, temperature of the cover 106 rises with rising of the temperature of the laser driver IC 104. The cover 106 covers almost the whole portion on the bottom face side of the frame 105 on which the optical system is mounted and thus the temperature of the whole frame 105 also rises with rising of the temperature of the cover 106. Further, with rising of the temperature of the cover 106, temperature of the optical elements which are covered by the cover 106 also rises.

With higher-density recording and speeding-up for an optical disk in recent years, the amount of heat generated in the laser driver IC 104 which drives the laser beam emitting element is increased. On the other hand, with the miniaturization and thinning of an optical head device, the heat sink is also downsized. Therefore, the temperature of the whole frame 105 rises and the temperature of the optical elements covered by the cover 106 becomes higher and thus optical characteristics of the optical head device 101 are affected. In other words, fixed positions of the optical elements structuring the optical system are displaced by temperature rising of the frame 105 and thus optical characteristics of the optical head device 101 are affected.

Further, in the latter patent reference, adverse effects to the optical elements may be avoided by a laser driver IC which is arranged on an optical disk side and heat is radiated through a heat radiation member which is a different member from the cover. However, in this patent reference, the heat radiation member which is provided with both arm portions facing each other in a jitter direction is formed in a U-shape so as to avoid an actuator (objective lens drive mechanism). Therefore, although its outer shape is large, a sufficient heat radiation area is not obtained and thus heat radiation effect is not satisfactory. Further, a dedicated heat radiation member for the laser driver IC is required separately and thus the number of parts is increased. In addition, in a thin-type of optical head device used in a notebook-sized personal computer or the like, the heat radiation member is not exposed from an opening of a tray on which an optical disk is placed and thus cooling effect is not sufficient.

SUMMARY OF THE INVENTION

In view of the problems described above, an embodiment of the present invention may advantageously provide an optical head device in which a sufficient heat radiation effect is obtained in a frame type of laser beam emitting element even when the size of its heat radiating fin is reduced.

In view of the problems described above, another embodiment of the present invention may advantageously provide an optical head device which is capable of preventing positional displacement of an optical element due to heat generated in a laser driver IC to restrain effects to an optical characteristic and, in which a sufficient heat radiation effect is obtained even when the size of its heat radiating fin is reduced, and may advantageously provide a disk drive device on which the optical head device is mounted.

Thus, according to an embodiment of the present invention, there may be provided an optical head device including a frame type of laser beam emitting element which is provided with a heat radiating fin on which a laser chip is mounted, a light receiving element for signal detection, an optical system which structures an optical path from the light beam emitting element to an optical disk and an optical path from the optical disk to the light receiving element, a device frame on which the laser beam emitting element, the light receiving element and the optical system are mounted, and a heat radiation member which is formed of material having a superior heat conduction property. In this optical head device, when a side of the laser beam emitting element on which the laser chip is mounted is set to be an upper face side, the upper face side of the laser beam emitting element is fixed to the device frame, and an under face of the heat radiating fin which corresponds to a portion where the laser chip of the laser beam emitting element is mounted is exposed on an outer side to form an exposed part, and the heat radiation member is disposed to extend over the exposed part of the heat radiating fin and the device frame.

In accordance with an embodiment, in a frame type of laser beam emitting element, when a side of the laser beam emitting element on which the laser chip is mounted is set to be an upper face side, the upper face side of the laser beam emitting element is fixed to the device frame, and the under face of the heat radiating fin which corresponds to a portion where the laser chip of the laser beam emitting element is mounted is exposed on an outer side to form an exposed part, and the heat radiation member which is formed of material having a superior heat conduction property is disposed to extend over the exposed part the heat radiating fin and the device frame. Therefore, heat radiated from the under face of the heat radiation fin corresponding to the portion where the laser chip is mounted, in other words, heat radiated from the vicinity of the laser chip which is a heat generating source, is efficiently transmitted to the device frame through the heat radiation member. Therefore, even when the heat radiating fin is downsized, since a sufficient heat radiation effect is obtained, a service life time of the laser beam emitting element can be extended.

In accordance with an embodiment, the heat radiation member is a metal plate which includes three projecting parts formed in a substantially parallel to each other to be formed in an E-shape in a planar view. Especially, it is preferable that the laser beam emitting element is provided with both end parts of the heat radiating fin which are exposed on an outer side from molded resin in which the laser tip is accommodated, and two projecting parts formed on both sides of a center projecting part of the tree projecting parts of the metal plate are adjacently disposed on an outer side of the both end parts of the heat radiating fin. According to the structure as described above, the projecting parts which are formed on both sides of a central projecting part of the metal plate are disposed so as to extend along the both end parts of the heat radiating fin and thus the projecting parts which are formed on both sides of the center projecting part of the metal plate can be enlarged while taking its space efficiency into consideration. Therefore, heat radiated from the heat radiating fin to the center projecting part can be efficiently transmitted from the projecting parts formed on both sides of the center projecting part to the device frame without causing the optical head device to enlarge.

In accordance with an embodiment, the laser beam emitting element includes both end parts of the heat radiating fin which are exposed on an outer side from molded resin in which the laser chip is accommodated, and the both end parts are directly fixed to the device frame. According to the structure as descried above, heat is efficiently radiated from both the end parts of the heat radiating fin to the device frame.

In accordance with an embodiment, the device frame includes a mainframe which is formed of a frame-shaped member made of resin and in which bearings are formed on both end portions of the mainframe, and a subframe made of metal which is disposed on an inner side of the mainframe and on which the light emitting element is mounted, and a connecting part for connecting with the mainframe is formed at an end part of the subframe and the light emitting element is mounted near the connecting part. According to the structure as described above, the subframe has a high heat transmission property and the mainframe is inexpensive. Therefore, according to this embodiment, cost and weight of the device frame can be reduced and heat generated in the light emitting element is efficiently transmitted and radiated to the mainframe through the subframe.

In accordance with an embodiment, the subframe is provided with an elongated opening in which an optical element structuring the optical system is accommodated ahead in an emitting direction of the laser beam emitting element, the elongated opening is formed with a depth which enables the entire of the optical element to be sufficiently accommodated, and a pair of wall parts which are formed in an separated manner each other in the emitting direction of the laser beam emitting element so as to form the elongated opening, and the optical element is fixed to a forward wall part of a pair of the wall parts in the emitting direction of the light emitting element. According to the structure as described above, for example, a rearward wall part of a pair of the wall parts in the emitting direction of the light emitting element can be separated from the optical element and thus the optical element can be further separated from the light emitting element and thus an adverse effect to the optical element due to heat generated in the laser beam emitting element can be suppressed.

Further, according to an embodiment of the present invention, there may be provided an optical head device including a light emitting element, a light receiving element for signal detection, optical elements which structure an optical path from the light beam emitting element to an optical disk and an optical path from the optical disk to the light receiving element, an objective lens drive mechanism for driving an objective lens as one of the optical elements, a laser driver IC for driving the light emitting element, and a device frame on which the laser driver IC, the light emitting element, the optical elements and the objective lens drive mechanism are mounted. The device frame includes a protective cover for protecting an optical disk side of the optical elements and the objective lens drive mechanism. The protective cover includes a first protective cover which covers the optical disk side of the optical elements, and a second protective cover which covers the optical disk side of the objective lens drive mechanism and which is separately formed from the first protective cover and made of material having a superior heat conduction property. In addition, a part of the second protective cover is extended to the laser driver IC, which is disposed to be exposed on the optical disk side, to form a heat radiation part where heat generated in the laser driver IC can be radiated.

In accordance with an embodiment, the second protective cover which is provided with the heat radiation part where heat generated in the laser driver IC can be radiated is separately formed from the first protective cover which covers the optical disk side of the optical elements. Therefore, heat generated in the laser driver is not transmitted to the first protective cover. Accordingly, positional displacement of the optical elements, which are covered with the first protective cover, due to heat generated in the laser driver is prevented and effect to an optical characteristic can be restrained. Further, the second protective cover is formed of material having a superior heat conduction property and disposed on the optical disk side and thus heat radiation efficiency can be improved by utilizing circulation of air according to rotation of the optical disk. Therefore, a sufficient heat radiation effect can be obtained even when the second protective cover is small.

In accordance with an embodiment, the device frame includes a mainframe which is formed of a frame-shaped member made of resin and in which bearings are formed on both end portions of the mainframe, and a subframe made of metal which is disposed on an inner side of the mainframe and on which at least a part of the light emitting element, the light receiving element for signal detection and the optical elements is mounted. According to the structure as described above, the subframe has a high heat transmission property and the mainframe is inexpensive. Therefore, according to this embodiment, cost and weight of the device frame can be reduced and heat generated in the light emitting element is efficiently transmitted and radiated to the cover members and the like through the subframe.

In accordance with an embodiment, an opposite side of the second protective cover to the objective lens drive mechanism with respect to the laser driver IC is fixed to the device frame and an opposite side of the second protective cover to the laser driver IC with respect to the objective lens drive mechanism is fixed to the device frame. Especially, it is preferable that the second protective cover is provided at the opposite side to the objective lens drive mechanism with respect to the laser driver IC with an extended part which is extended to an under face side of the device frame when the optical disk side of the device frame is set to be an upper face side of the device frame. According to the structure as described above, heat generated from the laser driver IC is capable of being transmitted to the device frame through the second protective cover in a balanced manner and thus heat radiation efficiency from the device frame can be improved.

In accordance with an embodiment, the objective lens drive mechanism and the laser driver IC are closely disposed each other in a radial direction of the optical disk, and the laser driver IC is disposed on an outer side of the objective lens drive mechanism in the radial direction. A rotational speed on an outer side of an optical disk is higher than that on an inner side in a radial direction and thus circulation efficiency of air is also large on its outer side. According to the structure as described above, the laser driver IC is disposed on an outer side in the radial direction of the optical disk and thus heat radiation efficiency can be improved by air cooling.

In accordance with an embodiment, the second protective cover is a metal plate which is made of copper, aluminum or stainless steel.

Further, according to an embodiment of the present invention, there may be provided a disk drive device on which the above-mentioned optical head device is mounted and which is provided with a tray on which the optical disk is placed. The tray is provided with an opening part which is opened along a movable direction of the optical head device for exposing the objective lens so as to face the optical disk and the second protective cover is exposed from the opening part so as to face the optical disk. According to the structure as described above, the second protective cover is exposed through the opening of the tray on which an optical disk is placed and flow of air is not disturbed by the tray and thus heat in the second protective cover is radiated by circulation of air. Therefore, heat radiation effect can be further improved.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 1 is a plan view showing an optical head device in accordance with an embodiment of the present invention.

FIG. 2(a) is a plan view showing an enlarged main body portion of the optical head device shown in FIG. 1 in which a flexible circuit board is not shown, FIG. 2(b) is its bottom view, FIG. 2(c) is its left side view, FIG. 2(d) is its right side view, and FIG. 2(e) is an "O-O" cross-sectional view in FIG. 2(b).

FIG. 4(a) is a plan view showing a state in which a flexible circuit board and an objective lens drive device are detached from the state shown in FIGS. 3(a) and 3(b), FIG. 4(b) is its bottom view, FIG. 4(c) is its left side view, FIG. 4(d) is its right side view, and FIG. 4(e) is an "N-N" cross-sectional view in FIG. 4(a).

FIG. 7 is a perspective showing a mainframe used in the optical head device shown in FIG. 1.

FIG. 8(a) is a plan view showing the mainframe shown in FIG. 7, FIG. 8(b) is its bottom view, FIG. 8(c) is its left side view, FIG. 8(d) is its right side view, and FIG. 8(e) is an "M-M" cross-sectional view in FIG. 8(a).

FIG. 11 is a perspective view showing an actuator cover used in the optical head device shown in FIG. 1.

FIG. 12(a) is a plan view showing the actuator cover shown in FIG. 11, FIG. 12(b) is its bottom view, FIG. 12(c) is its right side view, and FIG. 12(d) is its front view.

FIG. 13 is a schematic perspective view showing a part of a disk drive device on which the optical head device shown in FIG. 1 is mounted and which is viewed obliquely from above.

FIG. 14 is an enlarged perspective view showing a part of the disk drive device shown in FIG. 13.

FIG. 15 is a bottom view showing a state in which a cover of a conventional optical head device is detached.

FIG. 16 is a bottom view showing a conventional optical head device.

DETAILED DESCRIPTION OF THE PREFERRED EMBODIMENTS

An optical head device in accordance with an embodiment of the present invention will be described below with reference to the accompanying drawings. In this specification, a side on which an objective lens is viewed is defined as an upper face side and the opposite side is defined as an under face side.

Figure 3B:
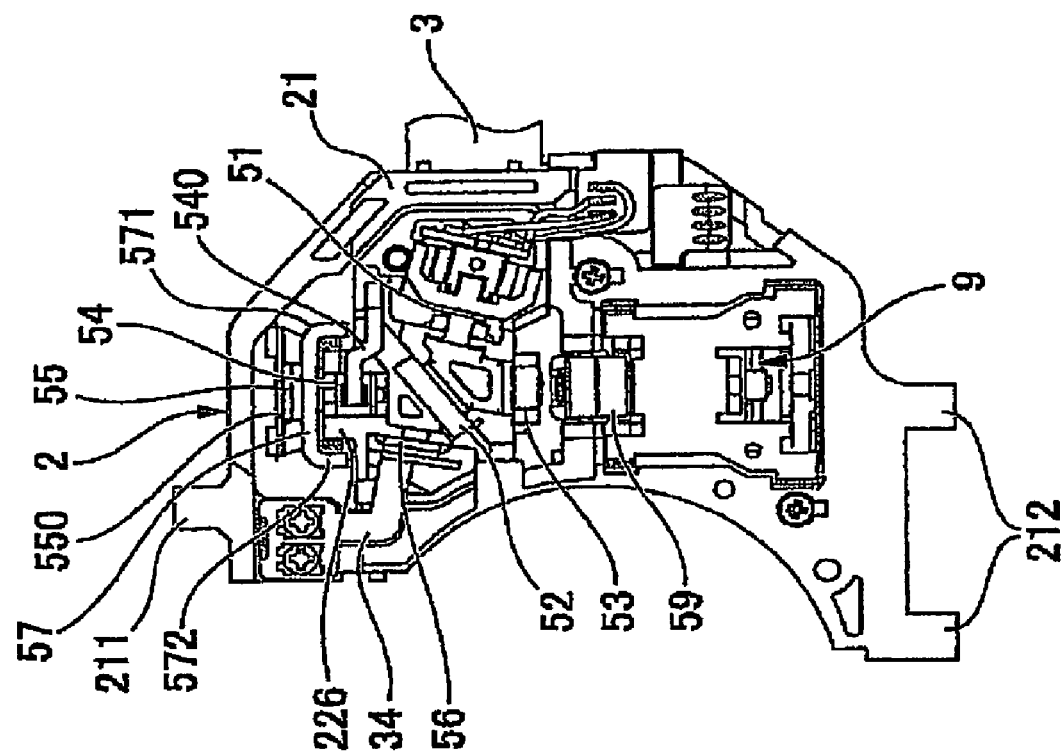
FIG. 3(b) is its bottom view.
Figure 3A:
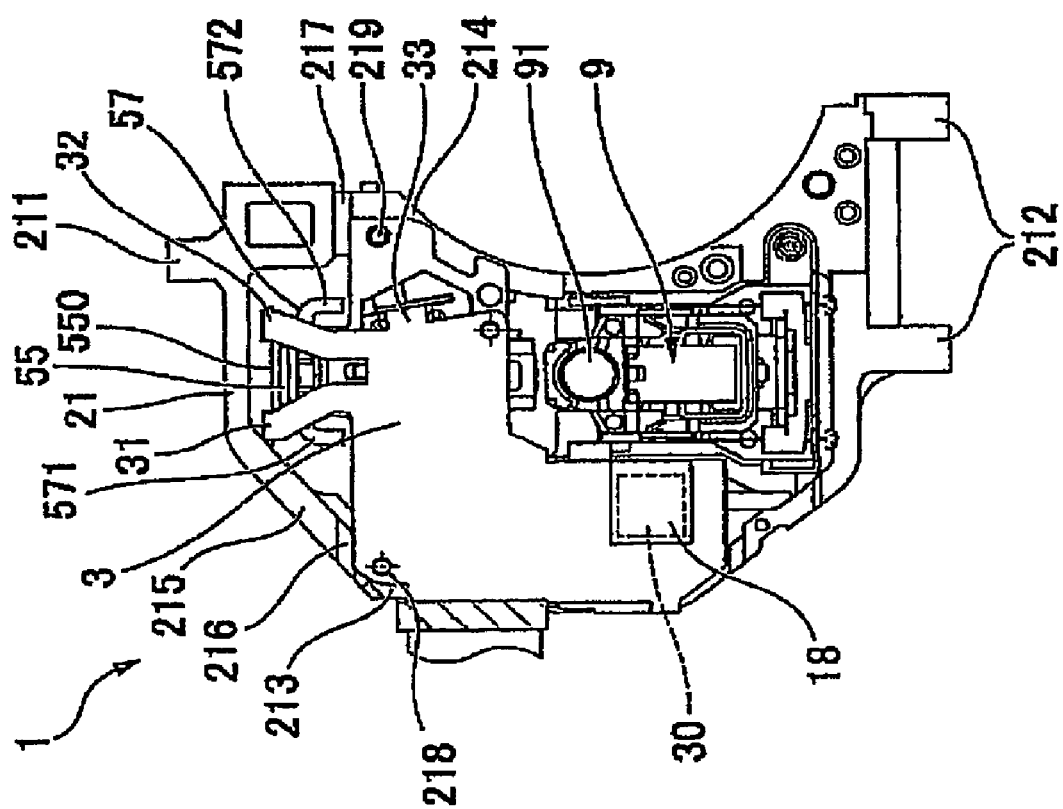
FIG. 3(a) is a plan view showing a state in which an upper cover, an under cover and an actuator cover are detached from the main body portion of the optical head device shown in FIG. 1
Figure 5A:
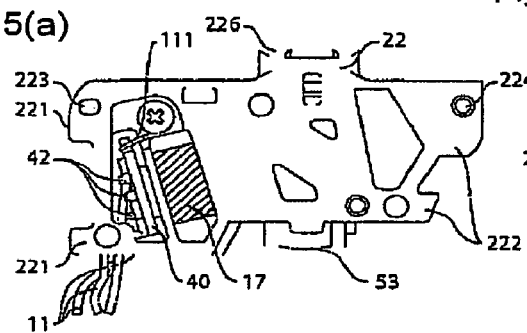
FIG. 5(a) is a plan view showing a subframe shown in FIG. 4(a)
Figure 5B:
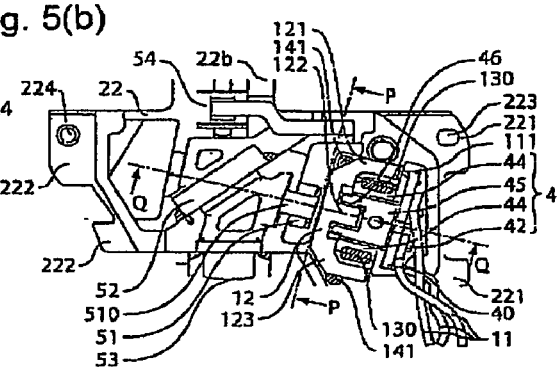
FIG. 5(b) is a bottom view showing the subframe shown in FIG. 4(b)
Figure 5C:
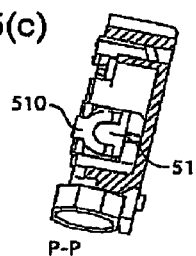
FIG. 5(c) is a "P-P" cross-sectional view in FIG. 5(b) and FIG. 5(d) is a "Q-Q" cross-sectional view in FIG. 5(b).
Figure 5D:
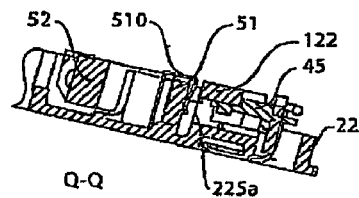
Figure 6A:
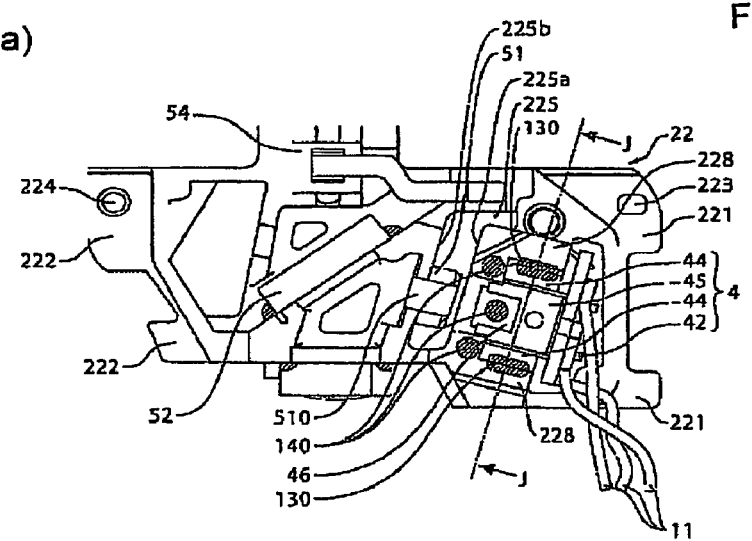
FIG. 6(a) is a plan view showing a state in which a metal member is detached from the subframe shown in FIG. 5(b) and FIG. 6(b) is a "J-J" cross-sectional view in FIG. 6(a).
Figure 6B:
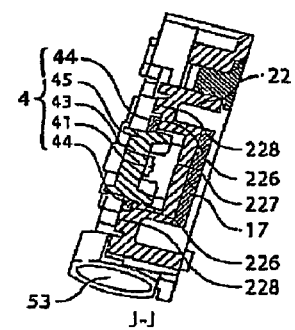

FIG. 1 is a plan view showing an optical head device in accordance with an embodiment of the present invention. FIG. 2(a) is a plan view showing an enlarged main body portion of the optical head device shown in FIG. 1 in which a flexible circuit board is not shown, FIG. 2(b) is its bottom view, FIG. 2(c) is its left side view, FIG. 2(d) is its right side view, and FIG. 2(e) is an "O-O" cross-sectional view in FIG. 2(b). FIG. 3(a) is a plan view showing a state in which an upper cover, an under cover and an actuator cover are detached from the main body portion of the optical head device shown in FIG. 1 and FIG. 3(b) is its bottom view. FIG. 4(a) is a plan view showing a state in which a flexible circuit board and an objective lens drive device are detached from the state shown in FIGS. 3(a) and 3(b), FIG. 4(b) is its bottom view, FIG. 4(c) is its left side view, FIG. 4(d) is its right side view, and FIG. 4(e) is an "N-N" cross-sectional view in FIG. 4(a). FIG. 5(a) is a plan view showing a subframe shown in FIG. 4(a), FIG. 5(b) is a bottom view showing the subframe shown in FIG. 4(b), FIG. 5(c) is a "P-P" cross-sectional view in FIG. 5(b) and FIG. 5(d) is a "Q-Q" cross-sectional view in FIG. 5(b). FIG. 6(a) is a plan view showing a state in which a metal member is detached from the subframe shown in FIG. 5(b) and FIG. 6(b) is a "J-J" cross-sectional view in FIG. 6(a).

As shown in FIG. 1 and FIGS. 2(a) through 2(d), an optical head device 1 in accordance with an embodiment of the present invention is provided with a first bearing part 211 and a second bearing part 212 formed on both ends of a device frame 2 for engaging with a feed screw shaft and a guide shaft of the disk drive device to drive in a radial direct of an optical disk. A side face on one side of the device frame 2 is curved in a circular arc shape in order to prevent interference when the device frame 2 approaches to a spindle motor 240 (see FIG. 13) in a disk drive.

An objective lens 91 is located at a substantially center portion on the upper face side of the device frame 2 and an upper cover 6 formed of a thin metal plate is placed on the first bearing part 211 side to the objective lens 91. The upper cover 6 includes an upper plate part 61 covering an upper face of the device frame 2, a first side plate part 62 which is bent downward from one of side edge portions of the upper plate part 61 to engage with a projection formed on a side face of the device frame 2, and a second side plate part 63 which is bent downward from the other of the side edge portions of the upper plate part 61 to engage with a projection formed on a side face of the device frame 2.

An under cover 8 formed of a thin metal plate is put on a bottom face of the device frame 2. The under cover 8 includes an under plate part 81 covering the under face of the device frame 2, first side plate parts 82 which are bent upward from one of side edge portions of the under plate part 81 to engage with a projection formed on a side face of the device frame 2, and a second side plate part 83 which is bent upward from the other of the side edge portions of the under plate part 81 to fit into a slit of the device frame 2 so as to apply an elastic force maintaining a state where the under cover 8 is mounted on the device frame 2.

An actuator cover 7 as a second protective cover, which is formed of a thin metal plate and will be described below with reference to FIG. 11 and FIGS. 12(a) through 12(d), is placed on a left side portion of the device frame 2 where the second bearing part 212 is located with respect to the objective lens 91. In this embodiment, a dustproof cover for covering the upper face side, i.e., the optical disk side of the device frame 2 is with the actuator cover 7 and the upper cover 6.

As shown in FIGS. 3(a) and 3(b), a main body portion of the flexible circuit board 3 shown in FIG. 1 is disposed to cover the upper face of the device frame 2 on a lower side of the actuator cover 7 and the upper cover 6. A laser driver IC 30 for driving a twin laser light source 4 which will be described below is mounted on an under face of the flexible circuit board 3. Two end parts 31, 32 are extended from the main body portion of the flexible circuit board 3 toward the first bearing part 211 side from the upper cover 6 side. The wiring patterns formed on the end parts 31, 32 are electrically connected to a light receiving element 55 for signal detection which will be described below. In addition, the flexible circuit board 3 is provided with end parts 33, 34 and the wiring patterns formed on the end parts 33, 34 are electrically connected to the twin laser light source 4 and a light receiving element 56 for front monitor which will be described below.

The device frame 2 includes a mainframe 21 which will be described below with reference to FIG. 7 and FIGS. 8(a) through 8(e) and a metal subframe 22 made of metal which will be described below with reference to FIGS. 9(a), 9(b) and FIGS. 10(a) through 10(e). The subframe 22 is held in the mainframe 21 in a state that the subframe 22 is disposed in the inner side of the mainframe 21.

As shown in FIGS. 3(a), 3(b) through FIGS. 6(a), 6(b), the optical head device 1 is a two-wavelength optical head device 1 which is capable of recording and reproducing information into or from a DVD disk and a CD disk by using a first laser beam (red light) with a wavelength of 650 nm band and a second laser beam (infrared light) with a wavelength of 780 nm band. The twin laser light source 4, which is integrally provided with an AlGaInp-based laser diode emitting the first laser beam and an AlGaAs-based laser diode emitting the second laser beam, is mounted on the device frame 2. In accordance with an embodiment, the first laser beam or the second laser beam is guided to a DVD disk or a CD disk which is an optical disk 300 through a common optical system comprising of a plurality of optical elements which are disposed on an optical path directing to the optical disk from the twin laser light source 4. The optical elements structuring the optical system are also mounted on the device frame 2. Further, a return light beam from the optical disk 300 is guided to the common light receiving element 55 for signal detection through the common optical system, and optical elements for forming an optical path for the light beam and the light receiving element 55 for signal detection are also mounted on the device frame 2.

In the optical head device 1 in accordance with this embodiment, the common optical system includes a diffraction element 51 for diffracting the first and second laser beams emitted from the twin laser light source 4 into three beams for tracking detection, a half mirror 52 partly reflecting the laser beams which are divided into three beams through the diffraction element 51, a collimating lens 53 for forming the laser beam from the half mirror 52 in a parallel light, a directing mirror 59 for directing the parallel light to the optical disk 300, and an objective lens 91 for converging the laser beam from the directing mirror 59 on a recording face of the optical disk 300 as the optical elements. The common optical system also includes a sensor lens 54 as an optical element for applying astigmatism to the return light beam of the first and the second laser beams passing through the collimating lens 53 and the half mirror 52 after reflected by the recording face of the optical disk 300. The light receiving element 56 for front monitor is disposed on an opposite side of the diffraction element 51 with respect to the half mirror 52.

The objective lens 91 is arranged such that its position in a tracking direction and a focusing direction is servo-controlled by the objective lens drive mechanism 9. The objective lens drive mechanism 9 is also mounted on the device frame 2. In accordance with this embodiment, a wire suspension type is used for the objective lens drive mechanism 9. A well-known objective lens drive mechanism may be used for the objective lens drive mechanism 9 and thus its detailed description is omitted. In accordance with this embodiment, the objective lens drive mechanism 9 includes a lens holder holding the objective lens 91, a holder support portion which movably supports the lens holder with a plurality of wires in the tracking direction and the focusing direction, and a yoke which is fixed to the device frame 2. Further, the objective lens drive mechanism 9 is provided with a magnetic drive circuit which is structured of drive coils attached to the lens holder and drive magnets attached to the yoke. The objective lens 91 which is held on the lens holder is driven in the tracking direction and the focusing direction on to the optical disk by controlling energization to the drive coils. Tilt control for adjusting a tilt of the objective lens 91 in a jitter direction may be performed in the objective lens mechanism 9.

In the optical head device 1 structured as described above, the first and the second laser beams which are emitted from the twin laser light source 4, after having transmitted through the diffraction element 51, are partly reflected by a partial reflection face of the half mirror 52 such that its optical axis is bent at 90 degrees to be directed to the collimating lens 53. The optical axis of the laser beam which is formed in a parallel light through the collimating lens 53 is bent at 90 degrees by the directing mirror 59 and the laser beam is directed to the objective lens 91. On the other hand, another part of the first and the second laser beams emitted from the twin laser light source 4 transmits through the partial reflection face of the half mirror 52 to be guided to the light receiving element 56 for front monitor as a monitor light beam. Monitoring result in the light receiving element 56 for front monitor is fed back to the twin laser light source 4 through the laser driver IC to cause an intensity of the laser beam emitted from the twin laser light source 4 to be controlled.

The return light beam from the optical disk 300 returns to the objective lens 91 and the directing mirror 59 in a reverse direction and is emitted to the sensor lens 54 through the collimating lens 53 and the half mirror 52. After astigmatism is generated through the sensor lens 54, the return light beam is incident on the light receiving element 55 for signal detection to detect a signal in the light receiving element 55. Three beams of the first and the second laser beams diffracted through the diffraction element 51 are included in the return light beam which is detected with the light receiving element 55 for signal detection. For example, reproduction of signal is performed by using a main beam comprised of a zero-order light beam among three beams, and a tracking error signal and a focusing error signal for the objective lens 91 are detected by using detection results of sub-beams comprised of +−1st-order light beams. In this manner, the laser driver IC controls the objective lens drive mechanism 9 on the basis of detection results of the tracking error signal and the focusing error signal.

In accordance with the embodiment described above, since recording and reproduction are performed by using the first laser beam and the second laser beam through the common objective lens 91, a two-wavelength lens on which diffraction grating is formed with concentric circular grooves or steps is used as the objective lens 91. Therefore, according to this embodiment, even when the objective lens 91 is commonly used, both the first laser beam and the second laser beam are applicable to optical disks 300 which are provided with recording layers whose surface protective layers are set to be different thicknesses.

Figure 9A:
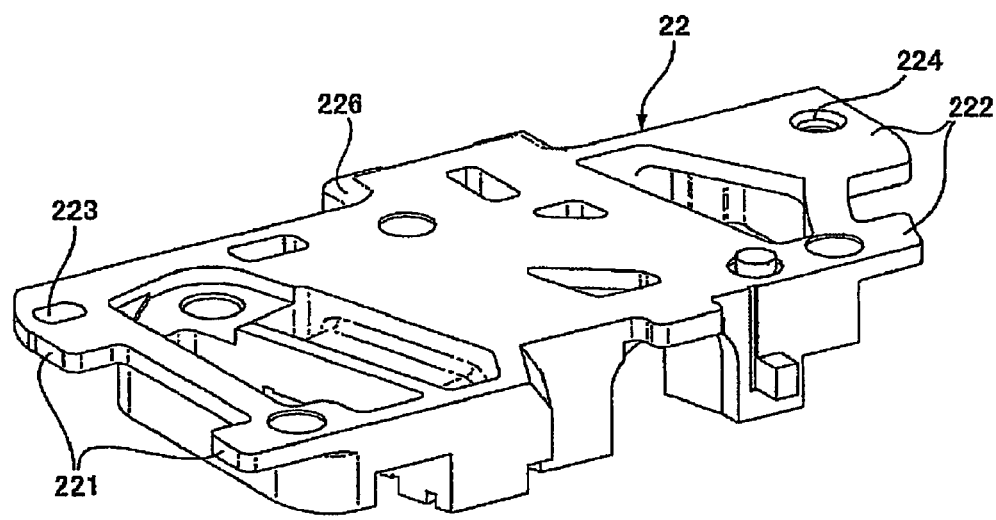
FIG. 9(a) is a perspective view showing the subframe used in the optical head device shown in FIG. 1 that is viewed obliquely from above.
Figure 9B:
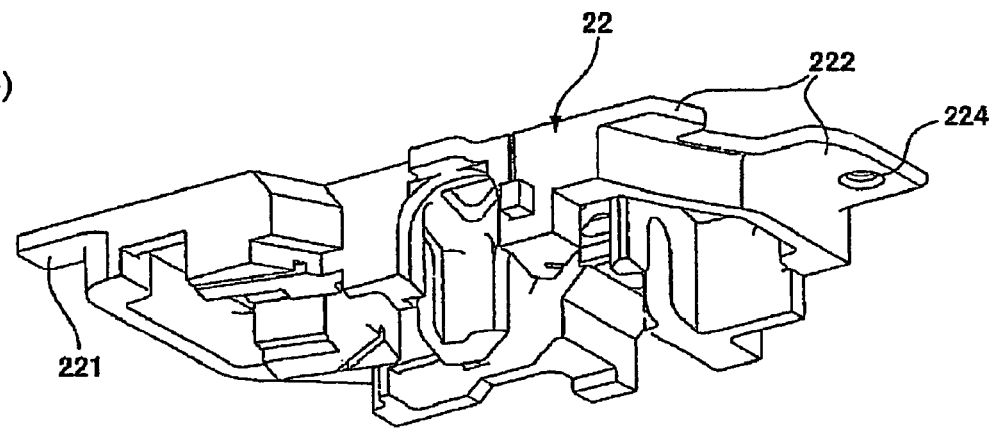
FIG. 9(b) is a perspective view showing the subframe that is viewed obliquely from below.
Figure 10A:
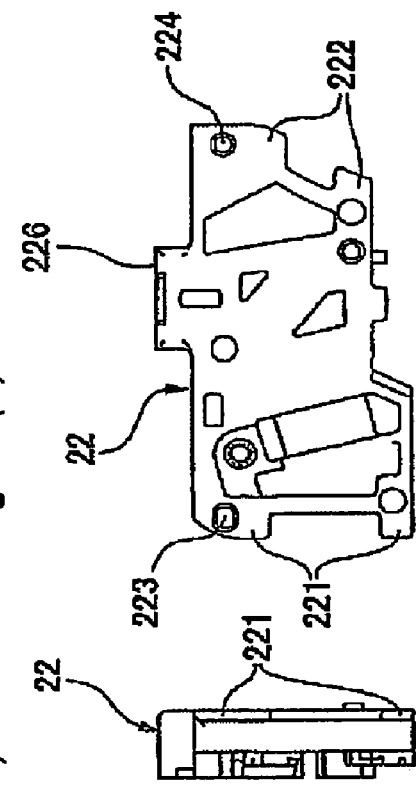
FIG. 10(a) is a plan view showing the subframe shown in FIGS. 9(a) and 9(b)
Figure 10B:
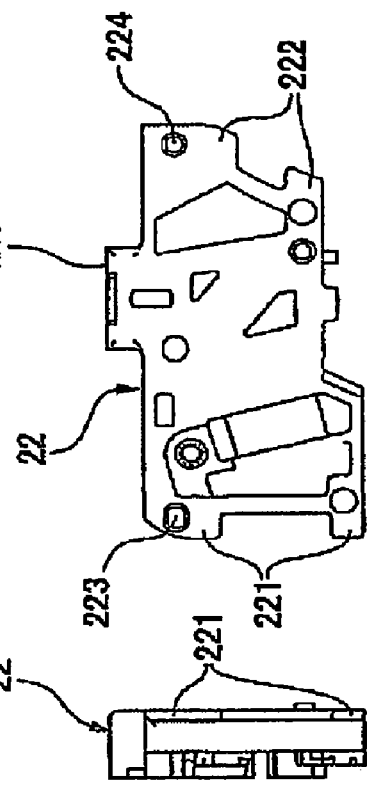
FIG. 10(b) is its bottom view.
Figure 10C:
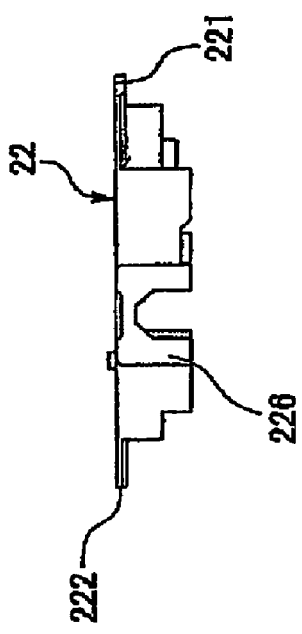
FIG. 10(c) is its front view.
Figure 10D:
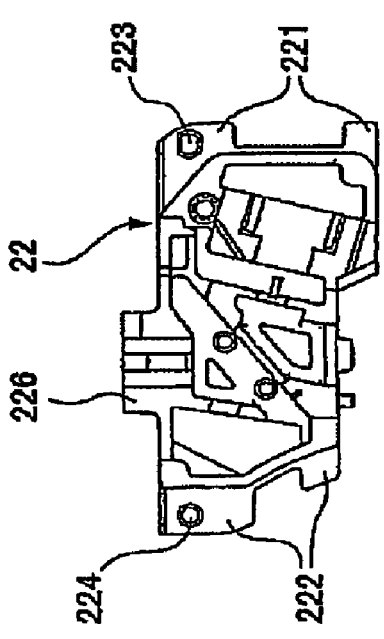
FIG. 10(d) is its left side view and FIG. 10(e) is its side view.
Figure 10E:
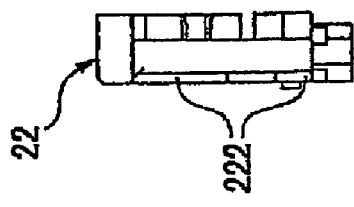

FIG. 7 is a perspective view showing a mainframe used in the optical head device shown in FIG. 1. FIG. 8(a) is a plan view showing the mainframe shown in FIG. 7, FIG. 8(b) is its bottom view, FIG. 8(c) is its left side view, FIG. 8(d) is its right side view, and FIG. 8(e) is a "M-M" cross-sectional view in FIG. 8(a). FIG. 9(a) is a perspective view showing the subframe used in the optical head device shown in FIG. 1 that is viewed obliquely from above, and FIG. 9(b) is a perspective view showing the subframe that is viewed obliquely from below. FIG. 10(a) is a plan view showing the subframe shown in FIGS. 9(a) and 9(b), FIG. 10(b) is its bottom view, FIG. 10(c) is its front view, FIG. 10(d) is its left side view and FIG. 10(e) is its right side view.

In the optical head device 1 in accordance with an embodiment, the device frame 2 includes a mainframe 21 comprised of a frame-shaped part made of resin which contains heat-conductive fillers as shown in FIG. 7 and FIGS. 8(a) through 8(e) and a subframe 22 made of metal as shown in FIGS. 9(a), 9(b) and FIGS. 10(a) through 10(e). As shown in FIGS. 2(a) through 2(e) and FIG. 4(a) through 4(e), the subframe 22 is held to the mainframe 21 in a state that the subframe 22 is disposed in a subframe mounting region 210 on an inner side of the mainframe 21. As shown in FIG. 7 and FIG. 8(a) through 8(e), the first bearing part 211, the second bearing part 212 and the like are formed in the mainframe 21. The subframe 22 shown in FIGS. 9(a), 9(b) and FIGS. 10(a) through 10(e) is, for example, a die casting product made of zinc alloy. As shown in FIG. 3(a) and 3(b), in the state that the subframe 22 is mounted on the mainframe 21, the inside of the device frame 2 is sectioned into a first optical element setting portion on which the subframe 22 is disposed and a second optical element setting portion on which the subframe 22 is not disposed.

In other words, in this embodiment, the twin laser light source 4, the diffraction element 51, the half mirror 52, the collimating lens 53, the sensor lens 54, the light receiving element 55 for signal detection and the light receiving element 56 for monitor are mounted on the subframe 22 and then the subframe 22 is mounted on the mainframe 21. On the other hand, the directing mirror 59 is directly mounted on the mainframe 21. Further, the objective lens drive mechanism 9 for driving the objective lens 91 is mounted on the mainframe 21 through the yoke which is fixed to the mainframe 21.

The structures of the respective parts which are used in the optical head device 1 will be described below in detail. The mainframe 21 shown in FIG. 7 and FIGS. 8(a) through 8(e) is provided with the first bearing part 211 and the second bearing part 212 at its both end portions. The subframe mounting region 210 is formed in the inside of the mainframe 21 on the first bearing part 211 side from the center in its longitudinal direction.

Two portions of the mainframe 21 interposing the subframe mounting region 210 are formed in a first subframe connecting region 213 and a second subframe connecting region 214 which are respectively provided with positioning projections 218, 219 for positioning the subframe 22. The first subframe connecting region 213 is formed as a portion which is bent and extended from an end part of an oblique side part adjacent to an end part region 215 on the side of the first bearing part 211. On the other hand, the second subframe connecting region 214 is formed in a portion between the end part of the end part region 215 and a circular arc-shaped curved portion.

In this embodiment, as shown in FIG. 7 and FIG. 8(a), the width dimension "W11" of the first subframe connecting region 213 and the width dimension "W12" of the second subframe connecting region 214 are set to be larger tan the width dimension "W21" of the end part region 215. In other words, the width dimension of the entire first subframe connecting region 213 is set to be larger than that of the end part region 215. Further, a region of the second subframe connecting region 214 which is close to the end part region 215 is set to have the width dimension substantially equal to that of the first subframe connecting region 213 and thus wider than the end part region 215.

Further, both thickness dimensions of the first subframe connecting region 213 and the second subframe connecting region 214 are set to be thinner than that of the end part region 215 and they are formed lower than the end part region 215. Therefore, in the mainframe 21, step portions corresponding to differences of these thicknesses are formed on an upper face of a boundary region 216 between the first subframe connecting region 213 and the end part region 215 and on an upper face of a boundary region 217 between the second subframe connecting region 214 and the end part region 215.

In this embodiment, the upper faces of two boundary regions 216, 217 are formed in an inclined face where thickness dimension is gradually decreased from the end part region 215 to the first subframe connecting region 213 and to the second subframe connecting region 214.

As shown in FIGS. 9(a), 9(b) and FIGS. 10(a) through 10(e), the subframe 22 is formed in a roughly rectangular planar shape. Its upper face is formed in a totally flat face, and ribs and projections/recesses for positioning the respective optical elements are formed on its under surface. In the subframe 22, a first connecting part 221 and a second connecting part 222 are extended in a thin plate shape to both right and left sides from the upper face. An elongated hole 223 to which a positioning projection 218 of the mainframe 21 is fitted is formed in the first connecting part 221 as a through hole. A circular hole 224 to which a positioning projection 219 of the mainframe 21 is fitted is formed in the second connecting part 222 as a through hole.

In order to mount the subframe 22 onto main frame 21, in a state that the subframe 22 is disposed in the subframe mounting region 210 of the main frame 21, the first connecting part 221 is put on the first subframe connecting region 213 of the main frame 21 and the second connecting part 222 is put on the second subframe connecting region 214 of the main frame 21. As a result, the positioning projections 218, 219 of the main frame 21 are respectively fitted into the elongated hole 223 of the first connecting part 221 and the circular hole 224 of the second connecting part 222 to perform positioning of the subframe 22. In this state, an outer end portion of the first subframe connecting region 213 and an outer end portion of the second subframe connecting region 214 are protruded outside from an edge portion of the first connecting part 221 and an edge portion of the second connecting part 222. Therefore, stepped parts 228, 229 are formed in the first subframe connecting region 213 and the second subframe connecting region 214 by using the edge portion of to first connecting part 221 and the edge portion of the second connecting part 222. Therefore, when an ultraviolet (UV) curing type of adhesive is coated on the stepped parts 228, 229 and then the adhesive is hardened by ultraviolet irradiation, the first connecting part 221 and the second connecting part 222 are adhesively fixed to the first subframe connecting region 213 and the second subframe connecting region 214. In this case, the adhesive enters into a gap space between the first subframe connecting region 213 and the first connecting part 221 and a gap space between the second subframe connecting region 214 and the second connecting part 222. Therefore, the first subframe connecting region 213 and the second subframe connecting region 214 are face-bonded with the first connecting part 221 and the second connecting part 222. In this embodiment, the face bonding portions formed as described above are referred to as connecting parts between the mainframe 21 and the subframe 22.

In FIGS. 3(a) through 6(b), the half mirror 52 is adhesively fixed to a center region of the subframe 22 and the diffraction element 51 is mounted at a side position of the half mirror 52. The diffraction element 51 is fixed with a flat spring 510.

The twin laser light source 4 is disposed at a side position of the diffraction on element 51 in the subframe 22. In accordance with an embodiment, the twin laser light source 4 is not a can type in which a laser chip 41 is accommodated in a cylindrical case, but is a frame type of laser light source in which a submount 43 on which a laser chip 41 is mounted is mounted on an upper face of a heat radiating fin 44. Both end portions of the heat radiating fin 44 are fixed to the subframe 22 with an adhesive 130. The twin laser light source 4 is structured such that the heat radiating fin 44 is molded in a rectangular shape with a resin portion 45 which surrounds the sub-mount 43 on which the laser chip 41 is mounted.

The subframe 22 is formed with stepped parts 226 to which a part of the heat radiating fin 44 of the twin laser light source 4 is fitted and a groove part 227 which accommodates the resin portion 45 in a non-contact state. An upper face on which the laser chip 41 of the twin laser light source 4 is mounted is directed to an upper face of the optical head device 1, and the upper faces of the heat radiating fins 44 are abutted with and mounted on the stepped parts 226 of the subframe 22 and, in this manner, the positioning in a vertical direction of the twin laser light source 4 is performed. The optical axis of the twin laser light source 4 is adjusted under a state that the upper faces of the heat radiating fins 44 are abutted with the stepped parts 226 of the subframe 22, and then the twin laser light source 4 is adhesively fixed with a UV adhesive 130. Further, a stepped length of the stepped part 226 is formed in the same thickness as that of the heat radiating fin 44. Therefore, when the twin laser light source 4 is mounted on the subframe 22 as described above, an under face of the heat radiating fin 44 becomes the same height as the under face 228 of the subframe 22.

As shown in FIG. 5(b), a metal member 12 which is formed in an E-shape in a plan view is adhesively fixed to the subframe 22 at a front position of the twin laser light source 4 by using a UV adhesive 141. A center projecting part 122 of three projecting parts 121, 122, 123 of the metal member 12 is disposed on an under face of the heat radiating fin 44 at a position corresponding to the rear face side of a portion where the laser chip 41 and the submount 43 are mounted. In other words, an exposed part 46 is formed by exposing the under face of the heat radiating fin 44, which corresponds to a portion on which the laser chip 41 of the twin laser light source 4 is mounted, to the outside, and the center projecting part 122 is disposed in the exposed part 46.

The both side projecting parts 121, 123 are respectively disposed on an under face 228 of the subframe 22 so as to be adjacently provided on outer sides of both end portions of the heat radiating fin 44. In order to adhesively fix the metal member 12 to the subframe 22, as shown in FIG. 6(a), a gel comprised of material superior to heat conductive property is coated to three spots 140 of the subframe 22 where the metal member 12 is to be disposed and, after that, the metal member 12 is mounted on the subframe 22 and adhesively fixed at two spots shown in FIG. 5(b) with the UV adhesive 141. When the metal member 12 is mounted on the subframe 22, the gel is squeezed by the metal member 12 that is filled between the metal member 12 and the subframe 22 without a gap space.

In this embodiment, as described above, the under face of the heat radiating fin 44 is set to be the same height as the under face 228 of the subframe 22. Therefore, all the opposite faces of the three projecting parts 121, 122, 123 of the metal member 12 facing the heat radiating fin 44 and the under face 228 of the subframe 22 are formed in the same plane and thus the metal member 12 is formed in a simple E-shape in a plan view.

As shown in FIGS. 5(a) and 6(a), an elongated opening 225, which is formed to extend on a front side of the projecting parts 121, 123 of the metal member 12 and in which the diffraction element 51 is accommodated, is formed at a front position of the twin laser light source 4. The elongated opening 225 are provided with wall parts 225a and 225b, which are perpendicular to the optical axis of the emitted light beam of the twin laser light source 4 and face each other, and the elongated opening 225 is formed in a depth so as to sufficiently accommodate the entire of the diffraction element 51. The wall part 225a on a rear side in the emitting direction of the twin laser light source 4 is disposed on the side where the twin laser light source 4 is mounted. The diffraction element 51 is fixed to the wall part 225b on the front side in the emitting direction of the twin laser light source 4, which faces the wall part 225a, with a flat spring 510 and an adhesive (not shown) as shown in FIGS. 5(b) through 5(d). Since a little gap space is formed between the wall part 225a and the diffraction element 51, effect to the diffraction element 51 due to heat generated in the twin laser light source 4 is suppressed.

A lead pin 42 extending backward of the twin laser light source 4 which is mounted on the subframe 22 is mounted on a light source mounting board 40 and three lead wires 11 are extended from the light source mounting board 40. An end portion of a ground wire 111 is connected to a ground pattern of the light source mounting board 40 by soldering and the other end portion of the ground wire 111 is fixed to the subframe 22 with a screw.

One end portions of three lead wires 11 are connected to the light source mounting board 40 by soldering and the other end portions are connected to the end part 33 of the flexible circuit board 3 by soldering.

A heat radiation sheet 17 is stuck on the upper face of the subframe 22 in a region where the twin laser light source 4 is mounted.

Protruded parts 226 in which an opening is formed are formed at an end part of the subframe 22 on the side where the first bearing part 211 of the mainframe 21 is provided. A supporting board 57 for supporting the light receiving element 55 for signal detection is adhesively fixed to the protruded parts 226. The light receiving element 55 is supported at a center in a longitudinal direction of the supporting board 57. End parts 571, 572 on both right and left sides of the supporting board 57 are bent so as to interpose the protruded parts 226 between them and the supporting board 57 is fixed to the protruded parts 226 with an adhesive. Since the structure as described above is employed in this embodiment, even when a space for disposing the light receiving element 55 is small, the size of the supporting board 57 can be increased. Therefore, since the supporting board 57 is provided with a high heat radiation property and a large heat capacity, temperature rise of the light receiving element 55 for signal detection due to heat generated in the twin laser light source 4 or the like can be prevented. Further, after the supporting board 57 has been adhesively bonded, even when imbalance is occurred in the contraction or expansion of the adhesives on both the right and left sides when an environmental temperature is changed, a variation of the position and attitude of the light receiving element 55 is restricted. The sensor lens 54 whose outside shape is cylindrical is disposed on the inner side of the protruded parts 226.

An opening which is formed in a substantially U-shaped groove is formed in the other end part of the subframe 22 and the collimating lens 53 is fixed to the opening.

Further, the light receiving element 56 for monitor to which an end part of the flexible circuit board 3 is connected is mounted on the subframe 22 on the rear side of the half mirror 52.

As shown in FIG. 11 and FIGS. 12(a) through 12(d), the actuator cover 7 is structured of a piece of metal plate which is worked into a specified shape. Also with reference in FIGS. 1 and 2(a), the actuator cover 7 includes a first upper plate part 71 as a heat radiation part described below which is formed in a trapezoid shape and covers a region where the laser driver IC 30 is mounted on the flexible circuit board 3, a second upper plate part 72 as a cooling part described below which is formed in a U-shape and extended toward the objective lens driving mechanism 9 side from the first upper plate part 71 to cover right and left wires, a fixing plate part 73 which is fixed to the device frame 2 with a metal screw at a tip end part of the second upper plate part 72, two pawl parts 74, 75 which are extended to an under face side of the device frame 2 from an outer peripheral edge portion of the first upper plate part 71 through an side face of the device frame 2, and an extended part comprising a side plate part 76, which is extended to an under side of the device frame 2 from the outer peripheral edge portion of the first upper plate part 71 so as to pass between two pawl parts 74, 75, and an under plate part 77 which is bent at a lower end part of the side plate part 76 to cover the under face side of the device frame 2. A boundary portion between the first upper plate part 71 and the second upper plate part 72 is formed as a stepped part by press working, and a boundary portion between the second upper plate part 72 and the fixing plate part 73 is formed as a stepped part by press working. The actuator cover 7 structured as described above is attached to the device frame 2 such that the first upper plate part 71 indirectly contacts through the heat radiation sheet 18 with the rear face of the flexible circuit board 3 at the region where the laser driver IC 30 is mounted.

FIG. 13 is a schematic perspective view showing a part of a disk drive device on which the optical head device shown in FIG. 1 is mounted and which is viewed obliquely from above. FIG. 14 is an enlarged perspective view showing a part of the disk drive device shown in FIG. 13.

A disk drive device 230 in accordance with an embodiment is used in a notebook-sized personal computer or the like and is provided with a tray 210 on which an optical recording disk 300 is placed and which is movably held in a housing not shown. The tray 210 is structured of a resin frame and is provided with an opening part 200 which is opened along a moving direction of the optical head device 1 disposed on its rear side for exposing the objective lens 91 so as to face the optical recording disk 300. The disk drive device 230 is provided with a spindle motor 240 for rotating the optical recording disk 300 at a substantially center portion of a placing part 210a for the optical recording disk 300.

A part of the spindle motor 240, a part of the actuator cover 7 and a part of the upper face cover 6 are exposed from the opening part 200 in addition to the objective lens 91. Especially, the second upper plate part 72 of the actuator cover 7 formed in a U-shape faces the optical recording disk 300 through a narrow gap space and thus a high degree of cooling efficiency by air is obtained. Accordingly, the second upper plate part 72 functions as a cooling part by air for efficiently cooling heat which is dissipated in the actuator cover 7 from the first upper plate part 71 in a trapezoid shape as a heat radiation part. In other words, airflow occurred by rotation of the optical recording disk 300 driven by the spindle motor 240 directly hits the second upper plate part 72 of the actuator cover 7 through the opening part 200 to accelerate air cooling to the second upper plate part 72 by the airflow and thus heat dissipated to the actuator cover 7 from the laser driver IC 30 can be effectively cooled. In accordance with this embodiment, since the first upper plate part 71 and the second upper plate part 72 are closely disposed each other, heat radiated to the first upper plate part 71 can be efficiently cooled by the second upper plate part 72.

The objective lens drive mechanism 9 and the laser driver IC 30 are closely disposed in a radial direction of the optical recording disk 300 and the laser driver IC 30 is disposed on an outer side in the radial direction. An airflow occurred by the rotation of the optical recording disk 300 driven by the spindle motor 240 is stronger on an outer peripheral side of the optical recording disk 300 than on an inner peripheral side. Therefore, in this embodiment, although the laser driver IC 30 is not exposed from to open part 200, a strong airflow flows into a rear side of the tray 210 through the opening part 200 to circulate air and thus radiation of heat from the upper face of the first upper plate part 71 can be efficiently performed.

When an optical head device 1 structured as described above is to be assembled, at fist, as shown in FIGS. 5(*a*) through 6(*b*), the twin laser light source 4, the diffraction element 51, the half mirror 52, the sensor lens 54 and the collimating lens 53 are mounted on the subframe 22. In this step, the light receiving element 55 for signal detection and the light receiving element 56 for monitor are not mounted on the subframe 22. Further, in this state, the diffraction element 51 and the sensor lens 54 are respectively temporarily fixed with the flat springs 510, 540.

Also in this state, the flexible circuit board 3 is not connected but, in this embodiment, the lead wires 11 are connected with the twin laser light source 4. Therefore, for example, a first laser chip for DVD of the twin laser light source 4 is turned on by supplying power from the lead wire 11 to observe a first laser beam emitted from the collimating lens 53. And, a position on an optical axis of the twin laser light source 4 is adjusted such that a light emitted from the collimating lens 53 becomes a collimate light. At this time, a position of the twin laser light source 4 in a direction perpendicular to the optical axis is also adjusted. Next, the second laser chip for CD is turned on and the second laser beam emitted from the collimating lens 53 is observed to adjust an angular position of the twin laser light source 4 and a position of the diffraction element 51. After that, the twin laser light source 4 is fixed with an adhesive 130.

In addition, under a state that the light receiving element 55 for signal detection is held by a robot or the like, the first laser beam and the second laser beam are emitted from the twin laser light source 4 and the light emitted through the collimating lens 53 is reflected by an inspection mirror instead of the optical recording disk 300, and the positions of the light receiving element 55 for signal detection and the sensor lens 54 are adjusted such that the reflected light beam forms a spot at a specified position of the light receiving element 55 for signal detection. After the above-mentioned positional adjustments have been performed, the light receiving element 55 for signal detection and the sensor lens 54 are adhesively fixed to the subframe 22.

After the adjustment has been performed on the subframe 22, the subframe 22 is mounted on the mainframe 21 on which the directing mirror 59 is mounted as shown in FIGS. 4(*a*) through 4(*e*). In this state, the objective lens drive mechanism 9 is not mounted on the mainframe 21.

When the subframe 22 is to be mounted on the mainframe 21, the first connecting part 221 and the second connecting part 222 of the subframe 22 are put on the first subframe connection part 213 and the second subframe connection part 214 of the mainframe 21, and positional adjustment is performed such that the positioning projections 218, 219 of the mainframe 21 are fitted into the elongated hole 223 and the circular hole 224 formed in the first connecting part 221 and the second connecting part 222. Further, the first laser chip 41 of the twin laser light source 4 is turned on and an emitted light beam from the directing mirror 59 is observed to adjust inclination or the like of the subframe 22.

After the above-mentioned adjustment work has been performed, a UV curing type of adhesive is coated at the stepped parts 228, 229 formed with the edge portion of the first connecting part 221 and the edge portion of the second connecting part 222 on the first subframe connecting region 213 and the second subframe connecting region 214. After that, the adhesive is solidified by ultraviolet irradiation to adhesively fix the first connecting part 221 and the second connecting part 222 to the first subframe connecting region 213 and the second subframe connecting region 214. In this case, the adhesive enters into a gap space between the first subframe connecting region 213 and the first connecting part 221 and a gap space between the second subframe connecting region 214 and the second connecting part 222. Therefore, the first subframe connecting region 213 and the second subframe connecting region 214 are face-bonded with the first connecting part 221 and the second connecting part 222.

Next, as shown in FIG. 3(a), the objective lens drive mechanism 9 is mounted on the mainframe 21. Further, the flexible circuit board 3 on which the laser driver IC 30 is mounted is mounted on the mainframe 21. In addition, the end parts 31, 32, 33, 34 of the flexible circuit board 3 are respectively connected to the wiring circuit board 550 on which the light receiving element 55 for signal detection is mounted, the light source mounting board 40 on which the twin laser light source 4 is mounted, and the light receiving element 56 for monitor.

Next, the actuator cover 7 is attached to the device frame 2 in the state that the heat radiation sheet 18 is disposed between the flexible circuit board 3 and the actuator cover 7. Further, the upper cover 6 is attached to the upper face of the device frame 2 and the under cover 8 is attached to the bottom face of the device frame 2. In this manner, the optical head device 1 is assembled.

As described above, in the optical head device 1 in accordance with this embodiment, the upper face of the twin laser light source 4 on which the laser chip 41 is mounted is directed to the upper face of the optical head device 1, and the upper face of the radiation fin 44 is mounted to abut with the stepped part 226 of the subframe 22, and the under face of the radiation fin 44 corresponding to the portion where the laser chip 41 of the twin laser light source 4 is mounted is exposed outside to form the exposed part 46, and the center projecting part 122 of the metal member 12 is disposed on the exposed part 46. Therefore, heat radiated from the under face side of the radiation fin 44 corresponding to the portion where the laser chip 41 is mounted to the center projecting part 122 can be efficiently transmitted to the subframe 22 through the projecting parts 121, 123 of the metal member 12 which are formed on both sides of the center projecting part 122. Further, heat can be also efficiently radiated to the subframe 22 from both the end parts of the radiation fin 44. Therefore, a service life of the twin laser light source 4 can be extended.

Further, in this embodiment, the projecting parts 121, 123 and both sides of the metal member 12 formed in the E-shape in a plan view are respectively disposed on the under face 228 of the subframe 22 so as to be adjacently provided on the outer side of both the end parts of the radiation fin 44. Therefore, when the projecting parts 121, 123 formed on both sides of the center projecting part 122 of the metal member 12 are disposed so as to extend along both end parts of the radiation fin 44, the size of the projecting parts 121, 123 can be made larger while considering their space efficiency. Accordingly, the heat radiated to the center projecting part 122 from the radiation fin 44 can be efficiently transmitted to the subframe 22 from the projecting parts 121, 123 and the size of the optical head device 1 is not required to be made larger.

In addition, in the optical head device 1 in accordance with this embodiment, the device frame 2 is structured of the mainframe 21 comprised of a resin frame-like part to which the subframe 22 comprised of a zinc die-casting product is adhesively fixed. Therefore, the device frame 2 is provided with a sufficient strength. Further, the subframe 22 is provided with a high heat transmission property and the mainframe 21 is inexpensive. Therefore, according to this embodiment, together with cost and weight reduction of the device frame 2, heat generated in the twin laser light source 4 can be radiated to the mainframe 21 through the subframe 22.

Further, as described above, since the optical head device 1 in accordance with the above-mentioned embodiment also performs recording to the optical recording disk 300, a lot of heat is generated in the laser driver IC 30. However, the laser driver IC 30 is put on and brought into contact with the first upper plate part 71 as a heat radiation part of the actuator cover 7 which is separately formed from the upper cover 6 for covering the twin laser light source 4 and a plurality of optical elements. Therefore, heat generated in the laser driver IC 30 is not transmitted to the upper cover 6 and thus the optical elements can be protected from heat generated in the laser driver IC 30. In addition, since the second upper plate part 72 as a cooling part of the actuator cover 7 faces the optical recording disk 300, the actuator cover 7 is cooled by air flow generated by rotation of the optical recording disk 300. Therefore, according to this embodiment, heat generated in the laser driver IC 30 is radiated effectively.

In addition, in this embodiment, an opposite side of the actuator cover 7 to the objective lens drive mechanism 9 with respect to the laser driver IC 30 is fixed to the mainframe 21 and an opposite side of the actuator cover 7 to the laser driver IC 30 with respect to the objective lens drive mechanism 9 is fixed to the mainframe 21. Especially, the actuator cover 7 is provided at the opposite side to the objective lens drive mechanism 9 with respect to the laser driver IC 30 with the side plate part 76 and the under plate part 77 as an extended part which is extended to the under face side of the mainframe 21 when the optical disk 300 side of the actuator cover 7 is set to be the upper face side. Therefore, heat generated in the laser driver IC 30 is transmitted from the actuator cover 7 to the mainframe 21 which contains heat-conductive fillers, and thus heat radiation efficiency from the mainframe 21 can be improved.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical head device comprising;
a frame type of laser beam emitting element which is provided with a heat radiating fin on which a laser chip is mounted;
a light receiving element for signal detection;
an optical system which structures an optical path from the light beam emitting element to an optical disk and an optical path from the optical disk to the light receiving element;
a device frame on which the laser beam emitting element, the light receiving element and the optical system are mounted; and
a heat radiation member which is formed of material having a superior heat conduction property;

wherein when a side on which said laser chip is mounted of the laser beam emitting element is defined as an upper face side;

the upper face of the laser beam emitting element is fixed in the device frame, and an under face of the heat radiating fin which corresponds to a portion where the laser chip of the laser beam emitting element is mounted is exposed on an outer side to form an exposed part, and the heat radiation member is disposed to extend over the exposed part and the device frame.

2. The optical head device according to claim 1, wherein the heat radiation member is a metal plate which includes three projecting parts formed in a substantially parallel to each other to be formed in an E-shape in a planar view.

3. The optical head device according to claim 2, wherein
the laser beam emitting element includes both end parts which are formed with both end parts of the heat radiating fin that are exposed on an outer side from molded resin in which the laser tip is accommodated, and two projecting parts formed on both sides of a center projecting part of the three projecting parts of the metal plate are adjacently disposed on an outer side of the both end parts of the heat radiating fin.

4. The optical head device according to claim 1, wherein the laser beam emitting element includes both end parts which are formed with both end parts of the heat radiating fin that are exposed on an outer side from molded resin in which the laser tip is accommodated, and the both end parts are directly fixed to the device frame.

5. The optical head device according to claim 1, wherein
the device frame includes a mainframe which is formed of a frame-shaped member made of resin and in which bearings are formed on both end portions of the mainframe;

a subframe made of metal which is disposed on an inner side of the mainframe and on which the light emitting element is mounted;

a connecting part for connecting with the mainframe is formed at an end part of the subframe; and the light emitting element is mounted near the connecting part.

6. The optical head device according to claim 5, wherein
the subframe is provided with an elongated opening in which an optical element structuring the optical system is accommodated ahead in an emitting direction of the laser beam emitting element; and the elongated opening is formed with a depth which enables an entire of the optical element to be sufficiently accommodated; and a pair of wall parts which are formed in an separated manner each other in the emitting direction of the laser beam emitting element so as to form the elongated opening; and the optical element is fixed to a forward wall part of a pair of the wall parts in the emitting direction of the light emitting element.

7. An optical head device comprising:
a light emitting element;
a light receiving element for signal detection;
optical elements which structure an optical path from the light beam emitting element to an optical disk and an optical path from the optical disk to the light receiving element;
an objective lens drive mechanism for driving an objective lens which is one of the optical elements;
a laser driver IC for driving the light emitting element; and a device frame on which the laser driver IC, the light emitting element, the optical elements and the objective lens drive mechanism are mounted;

wherein the device frame comprising a protective cover for protecting an optical disk side of the optical elements and the objective lens drive mechanism, and the protective cover comprising:

a first protective cover which covers the optical disk side of the optical elements; and a second protective cover which covers the optical disk side of the objective lens drive mechanism and which is separately formed from the first protective cover and made of material having a superior heat conduction property; and a part of the second protective cover is extended to the laser driver IC, which is disposed to be exposed on the optical disk side, to form a heat radiation part where heat generated in the laser driver IC is radiated.

8. The optical bead device according to claim 7, wherein
the device frame includes a mainframe which is formed of a frame-shaped member made of resin and in which bearings are formed on both end portions of the mainframe; and a subframe made of metal which is disposed on an inner side of the mainframe and on which at least one of the light emitting element, the light receiving element for signal detection and the optical elements is mounted.

9. The optical head device according to claim 7, wherein an opposite side of the second protective cover to the objective lens drive mechanism with respect to the laser driver IC is fixed to the device frame and an opposite side of the second protective cover to the laser driver IC with respect to the objective lens drive mechanism is fixed to the device frame.

10. The optical head device according to claim 9, wherein the second protective cover is provided at the opposite side to the objective lens drive mechanism with respect to the laser driver IC with an extended part which is extended to an under face side of the device frame when the optical disk side of the device frame is defined as an upper face side of the device frame.

11. The optical head device according to claim 7, wherein the objective lens drive mechanism and the laser driver IC are closely disposed to each other in a radial direction of the optical disk; and the laser driver IC is disposed on an outer side in the radial direction to the objective lens drive mechanism.

12. The optical head device according to claim 7, wherein the second protective cover is a metal plate made of one of copper, aluminum and stainless steel.

13. A disk drive device comprising:
an optical head device comprising:
a light emitting element;
a light receiving element for signal detection;
optical elements which structure an optical path from the light beam emitting element to an optical disk and an optical path from the optical disk to the light receiving element;
an objective lens drive mechanism for driving an objective lens as one of the optical elements;
a laser driver IC for driving the light emitting element; and
a device frame on which the laser driver IC, the light emitting element, the optical elements and the objective lens drive mechanism are mounted;
wherein the device frame comprising a protective cover for protecting an optical disk side of the optical elements and the objective lens drive mechanism, and the protective cover comprising:

a first protective cover which covers the optical disk side of the optical elements; and a second protective cover which covers the optical disk side of the objective lens drive mechanism and which is separately formed from the first protective cover and made of material having a superior heat conduction property, and a part of the second protective cover is extended to the laser driver IC, which is disposed to be exposed on the optical disk side, to form a heat radiation part where heat generated in the laser driver IC can be radiated; and a tray on which the optical disk is placed, the tray being provided with an opening part which is opened along a movable direction of the optical head device for exposing the objective lens so as to face the optical disk;

wherein the second protective cover is exposed from the opening part so as to face the optical disk.

14. The disk drive device according to claim 13, wherein an opposite side of the second protective cover to the objective lens drive mechanism with respect to the laser driver IC is fixed to the device frame and an opposite side of the second protective cover to the laser driver IC with respect to the objective lens drive mechanism is fixed to the device frame.

15. The disk drive device according to claim 14, wherein the second protective cover is provided at the opposite side to the objective lens drive mechanism with respect to the laser driver IC with an extended part which is extended to an under face side of the device frame when the optical disk side of the device frame is defined as an upper face side of the device frame.

16. The disk drive device according to claim 13, wherein the objective lens drive mechanism and the laser driver IC are closely disposed to each other in a radial direction of the optical disk; and the laser driver IC is disposed on an outer side in the radial direction to the objective lens drive mechanism.

* * * * *